April 27, 1954     A. W. BAKER ET AL     2,676,522
CELL CASE PARTITION ASSEMBLING MACHINE
Filed May 7, 1949     15 Sheets-Sheet 1
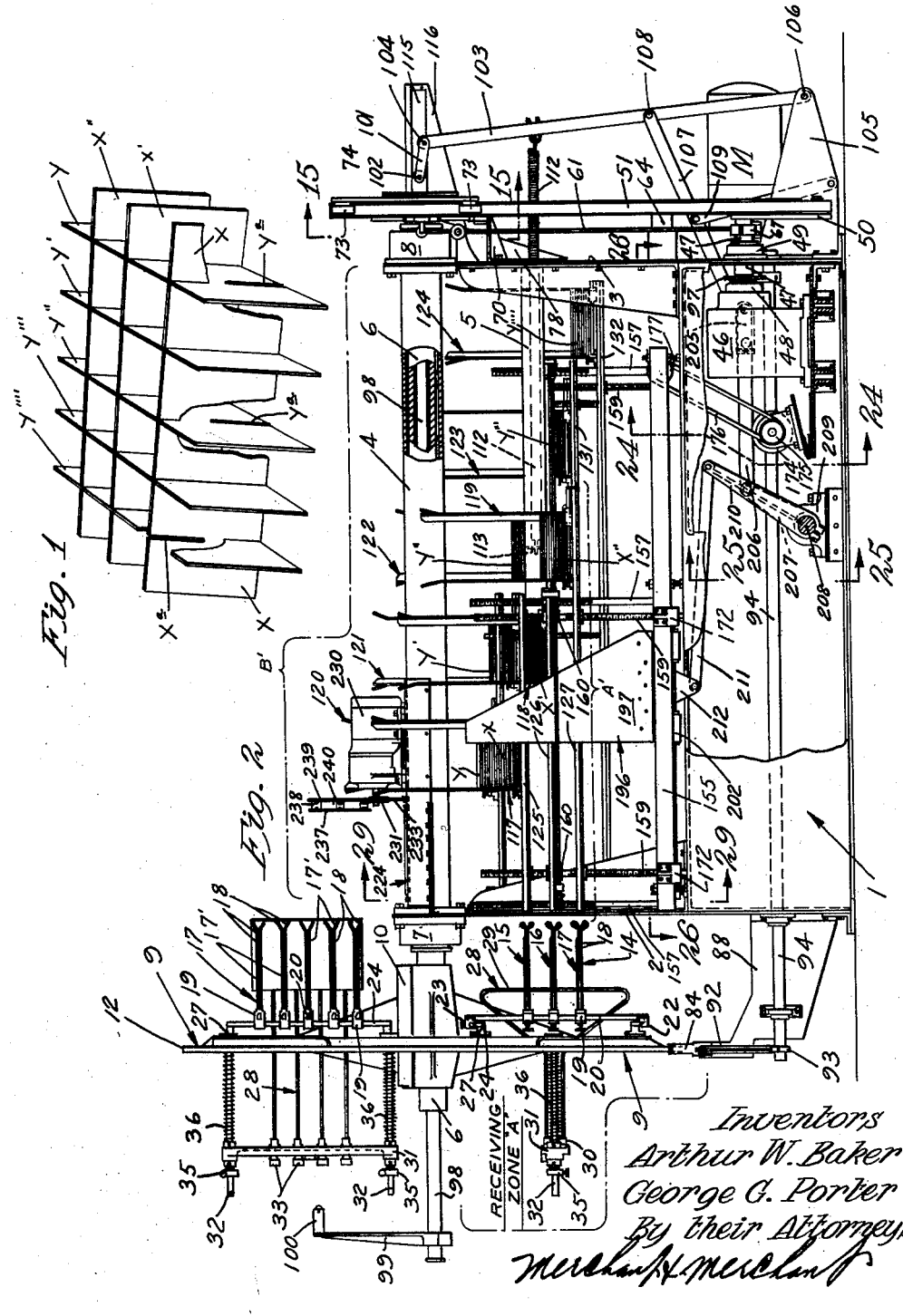
Inventors
Arthur W. Baker
George G. Porter
By their Attorneys April 27, 1954 — A. W. BAKER ET AL — 2,676,522
CELL CASE PARTITION ASSEMBLING MACHINE
Filed May 7, 1949 — 15 Sheets-Sheet 2
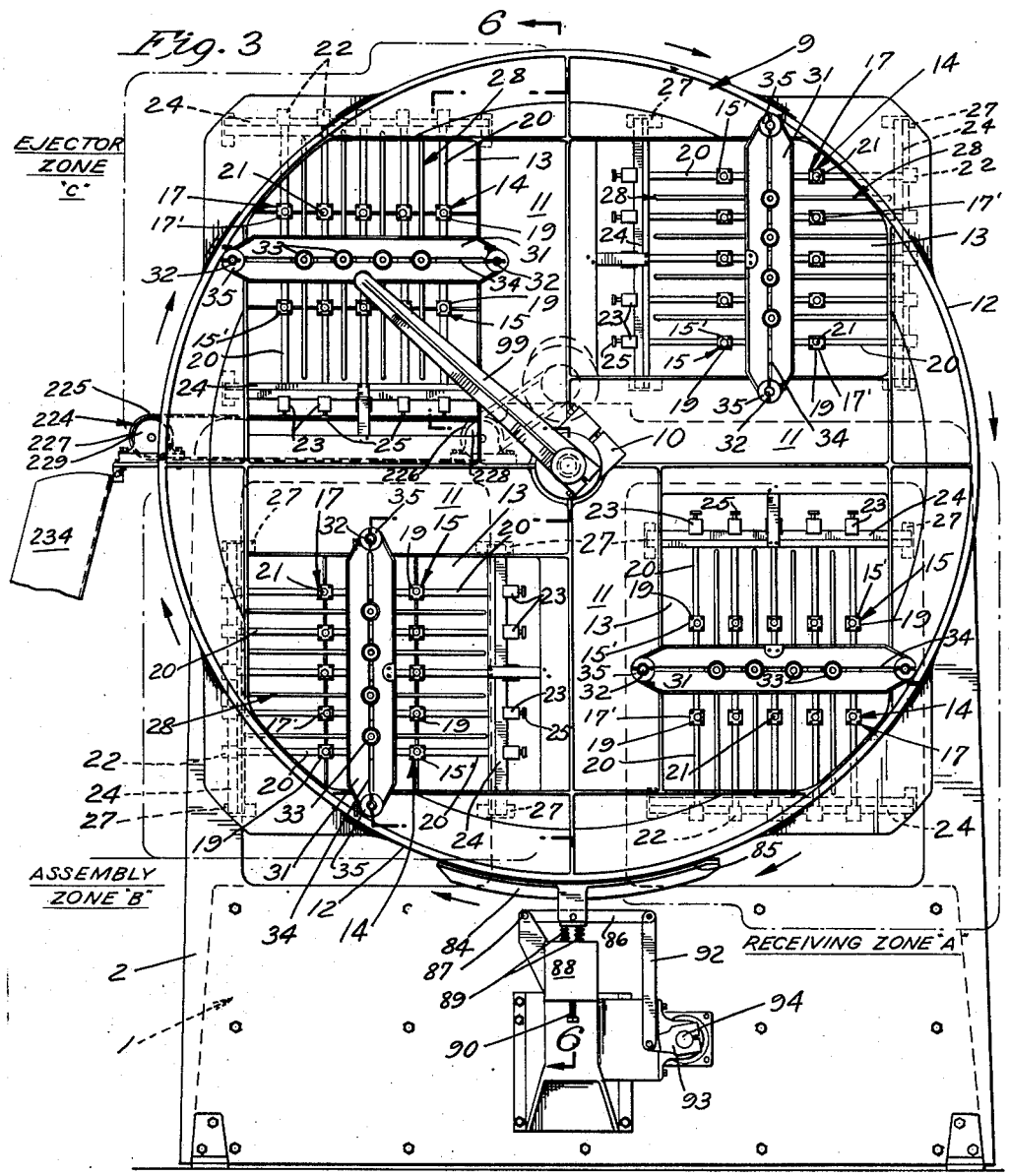
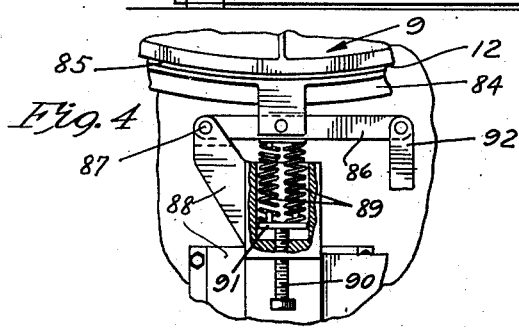
Inventors
Arthur W. Baker
George G. Porter
By their Attorneys

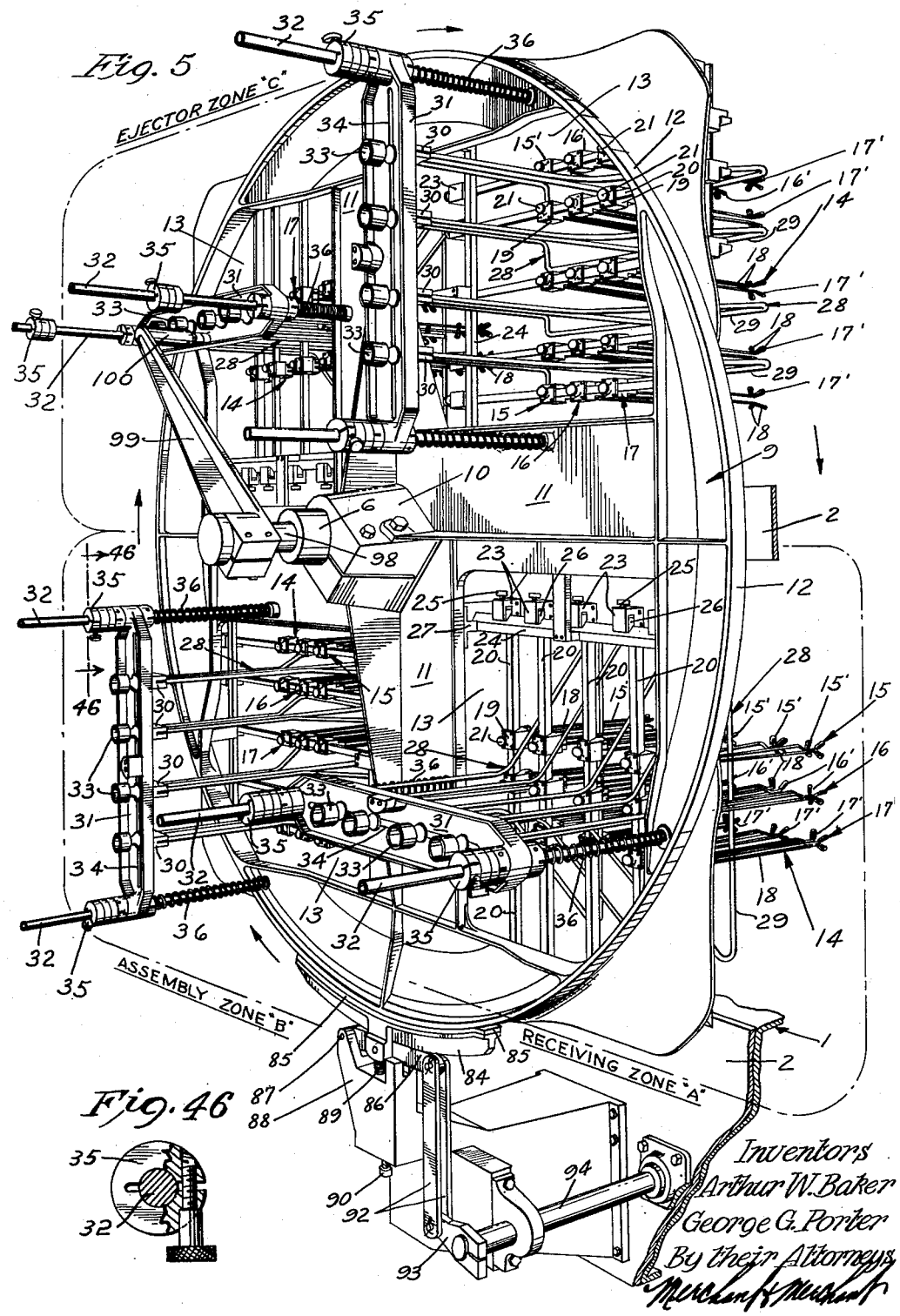

April 27, 1954 A. W. BAKER ET AL 2,676,522
CELL CASE PARTITION ASSEMBLING MACHINE
Filed May 7, 1949 15 Sheets-Sheet 4
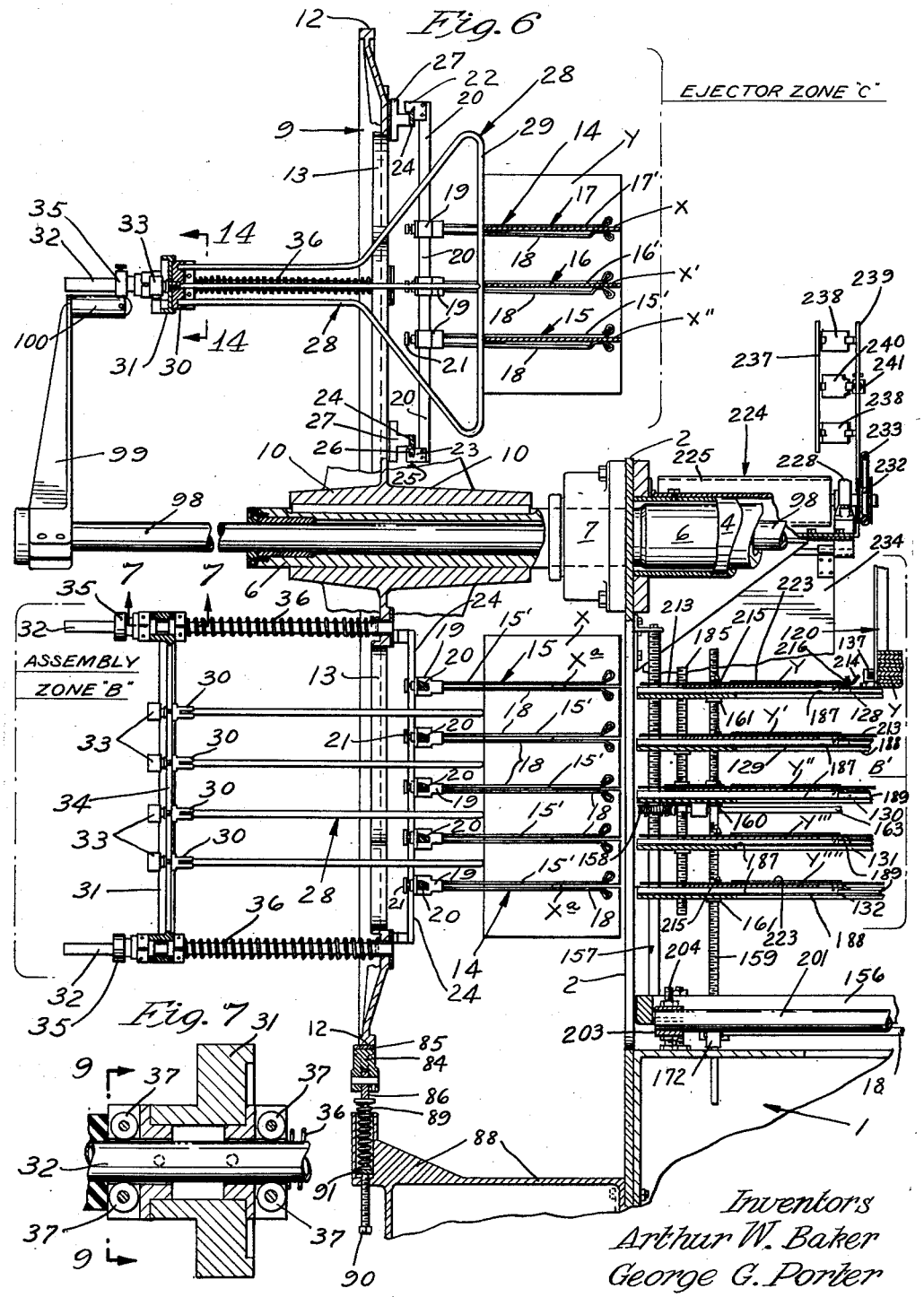
Inventors
Arthur W. Baker
George G. Porter
By their Attorneys
Merchant & Merchant

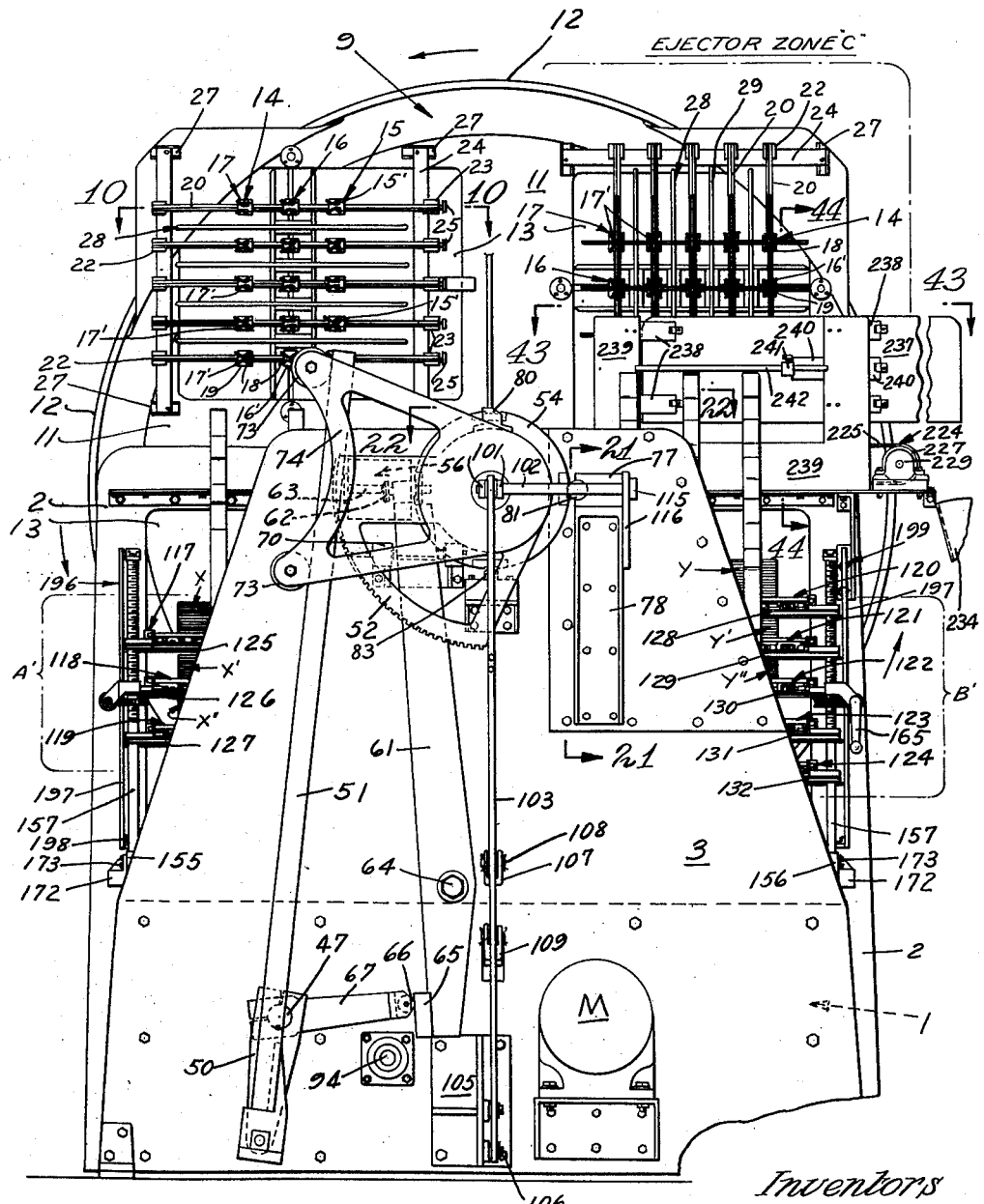

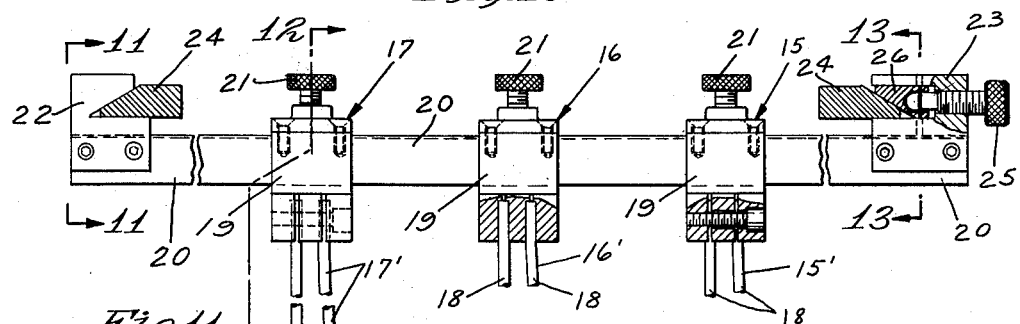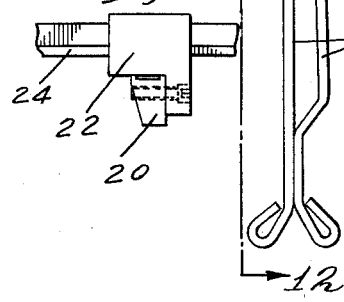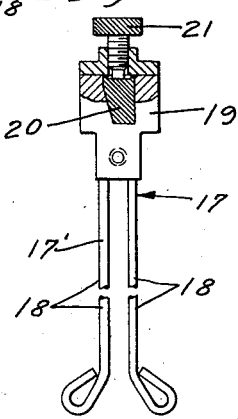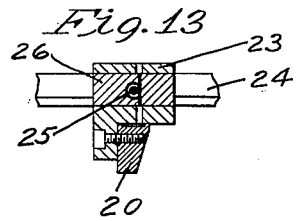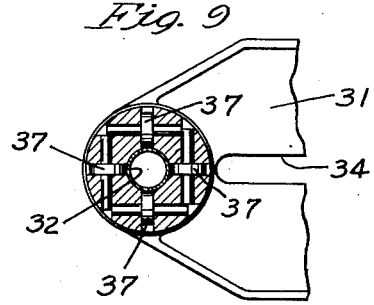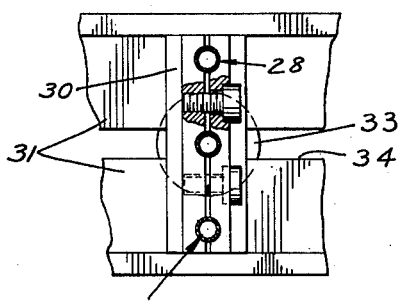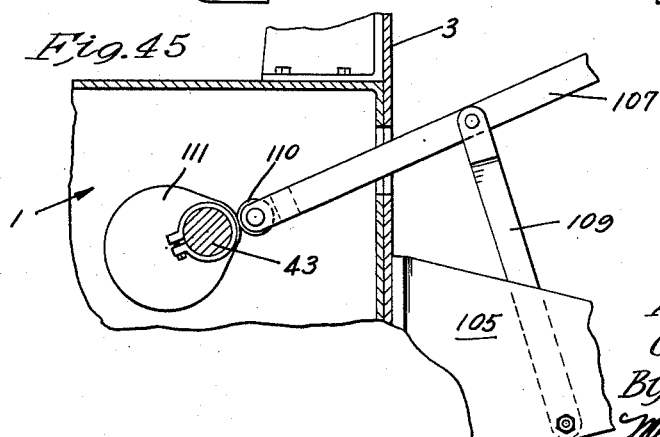

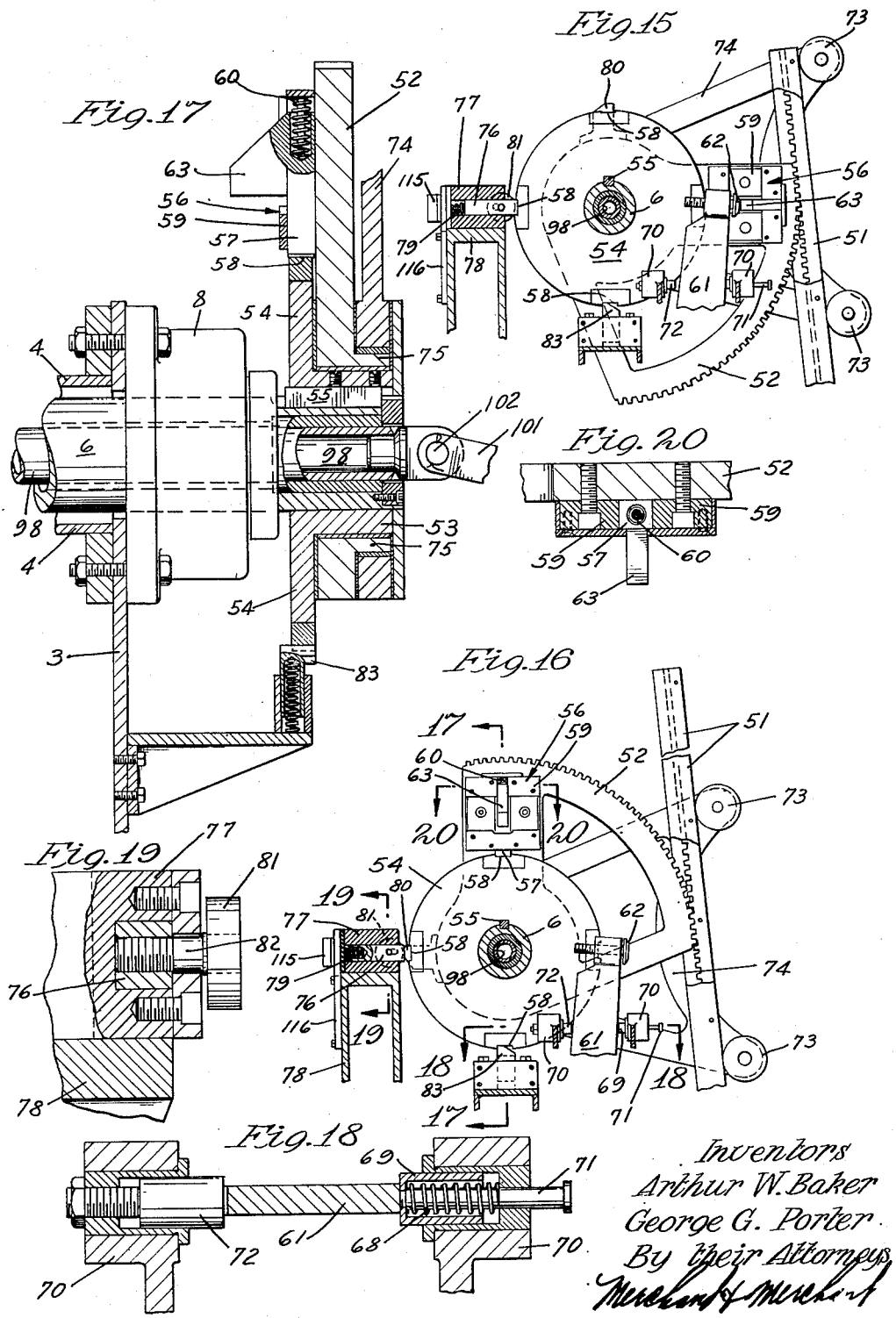

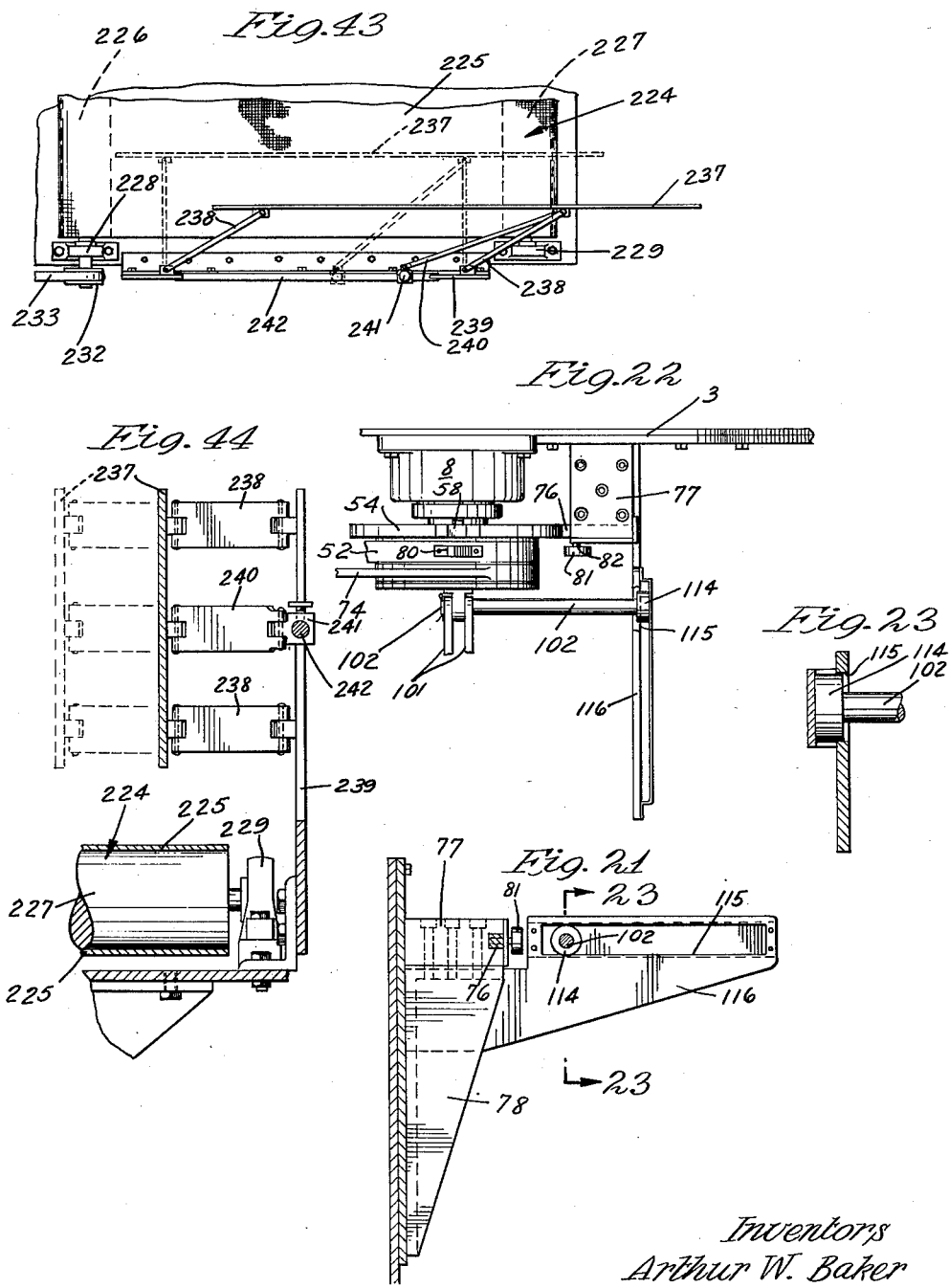

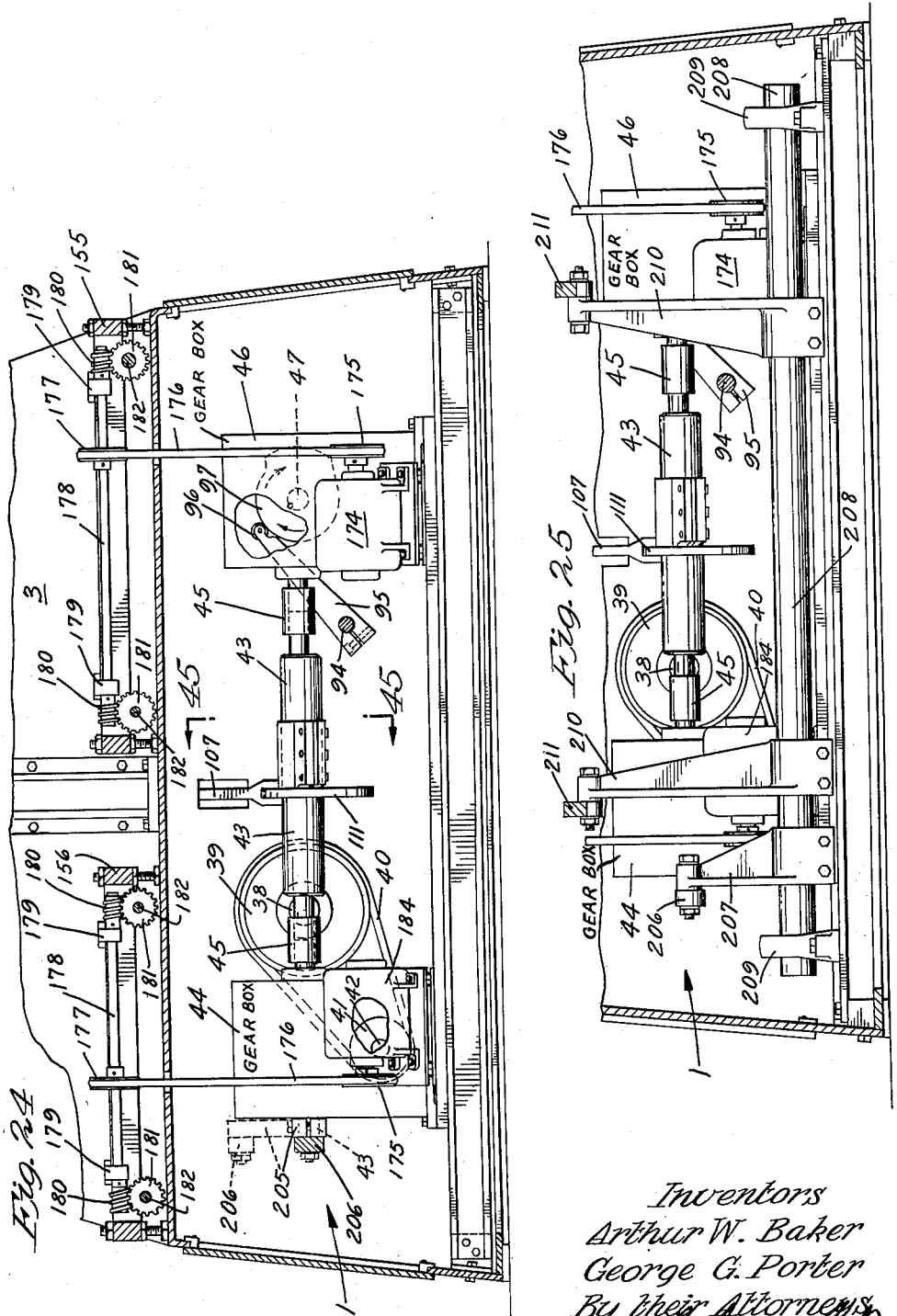

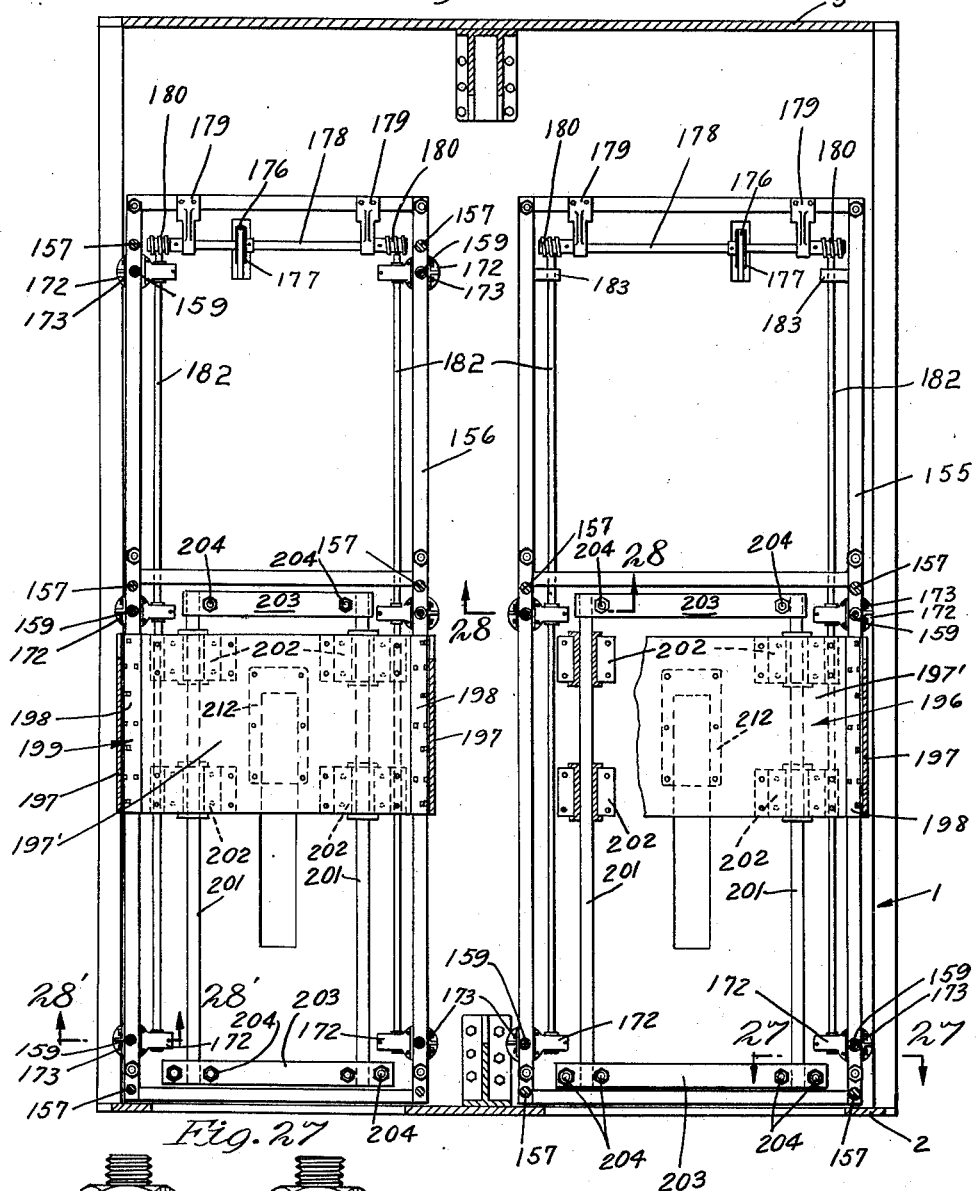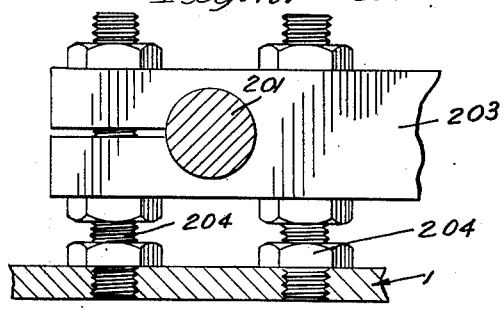

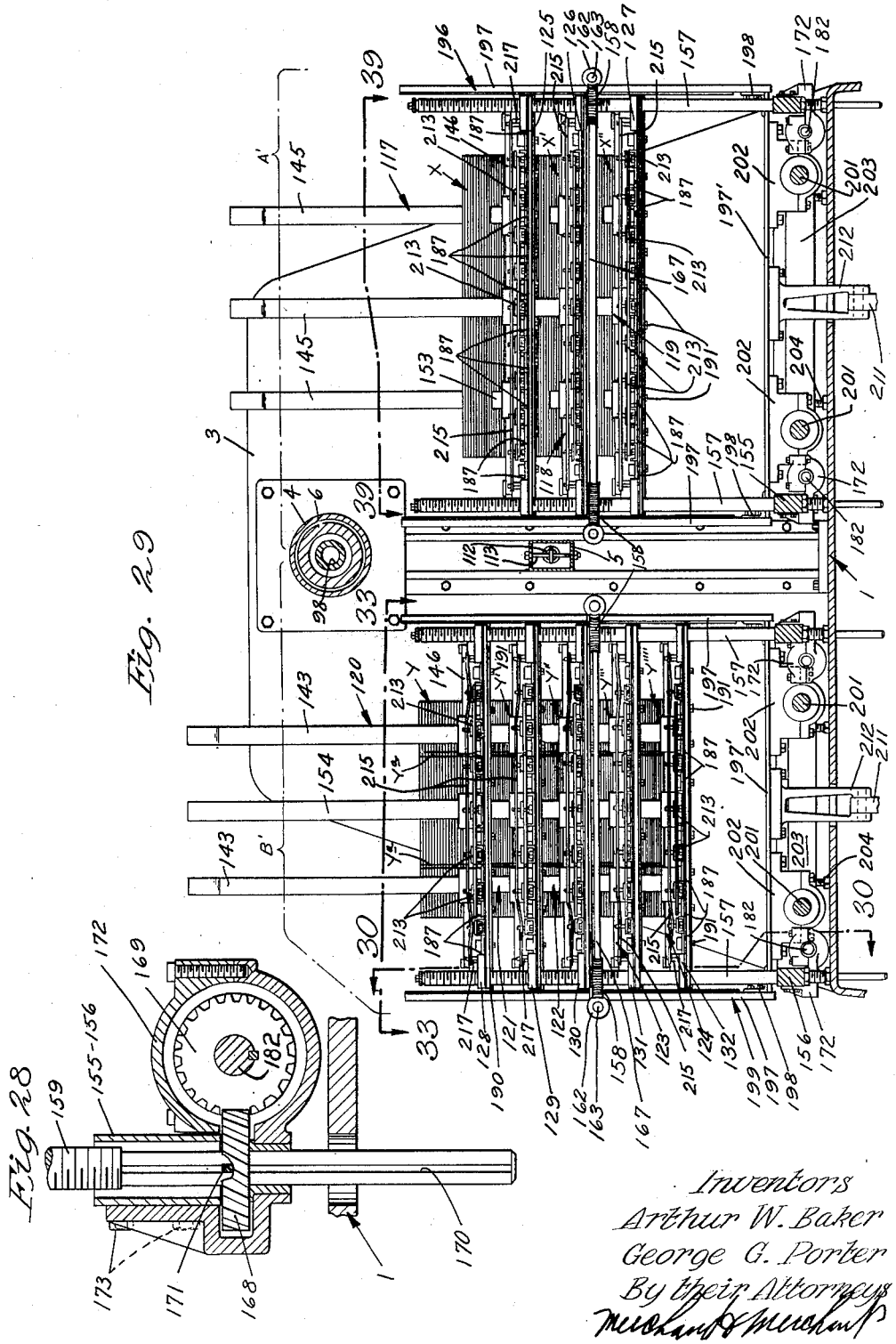

April 27, 1954 A. W. BAKER ET AL 2,676,522
CELL CASE PARTITION ASSEMBLING MACHINE
Filed May 7, 1949 15 Sheets-Sheet 12
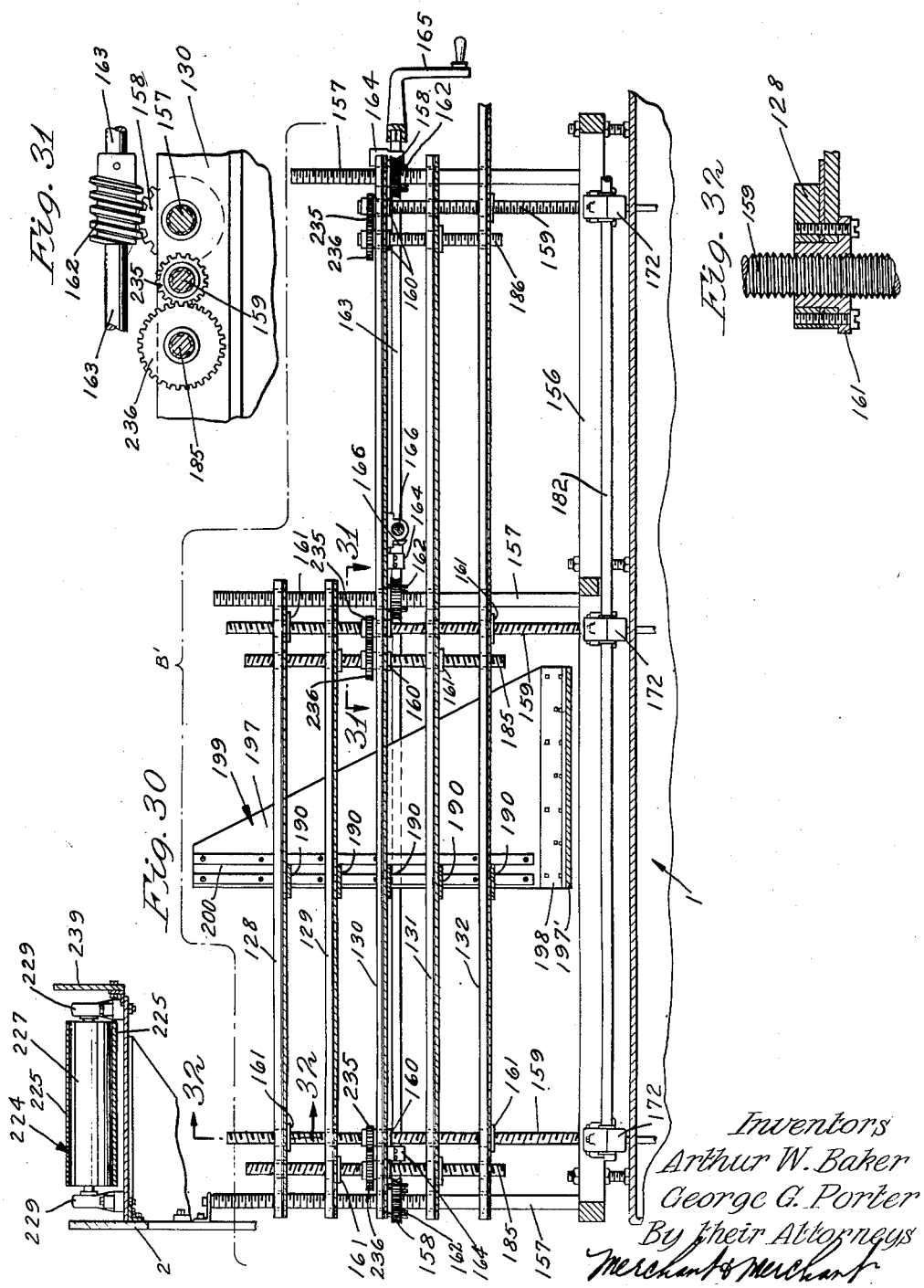
Inventors
Arthur W. Baker
George G. Porter
By their Attorneys
Merchant & Merchant

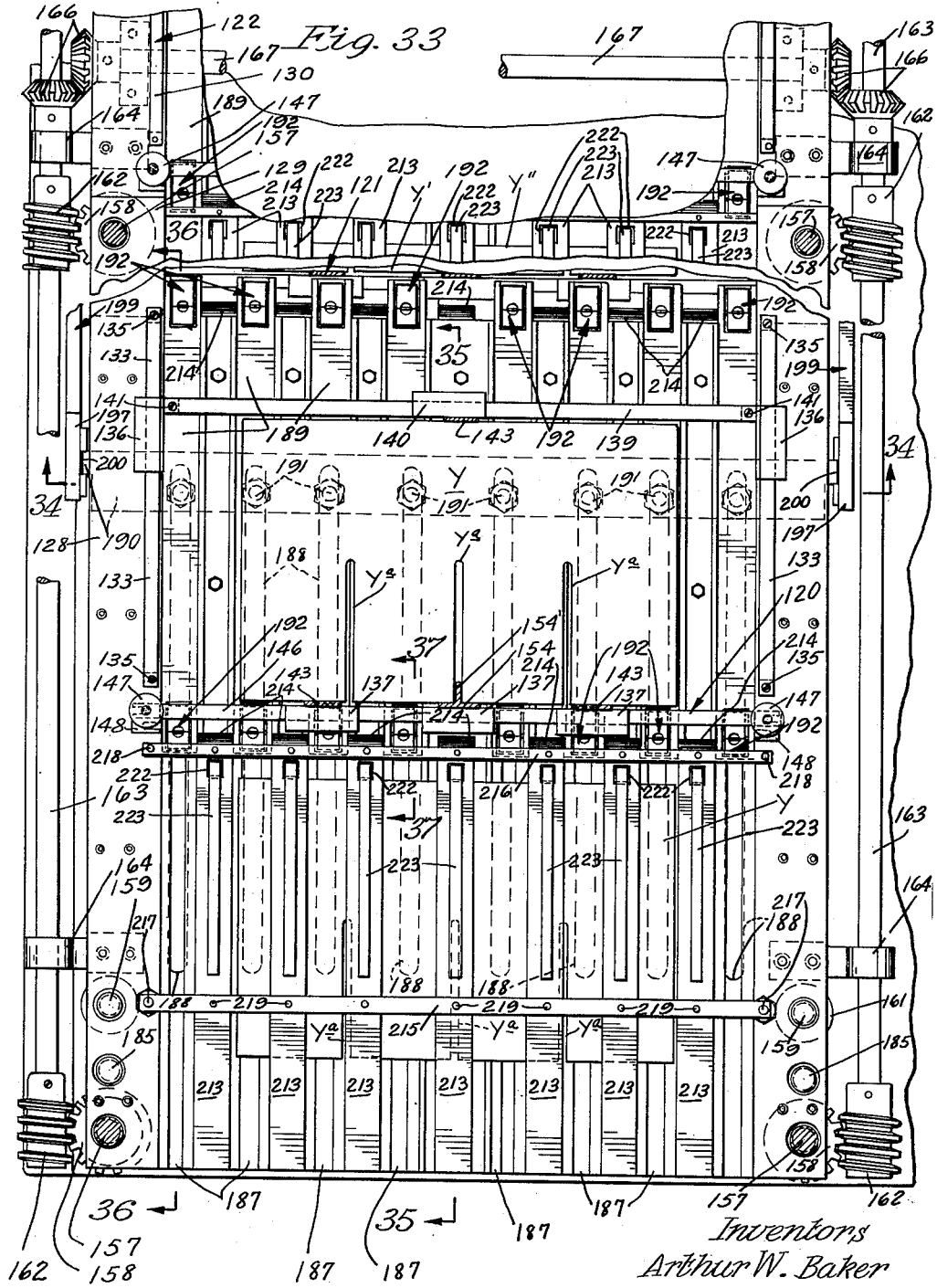

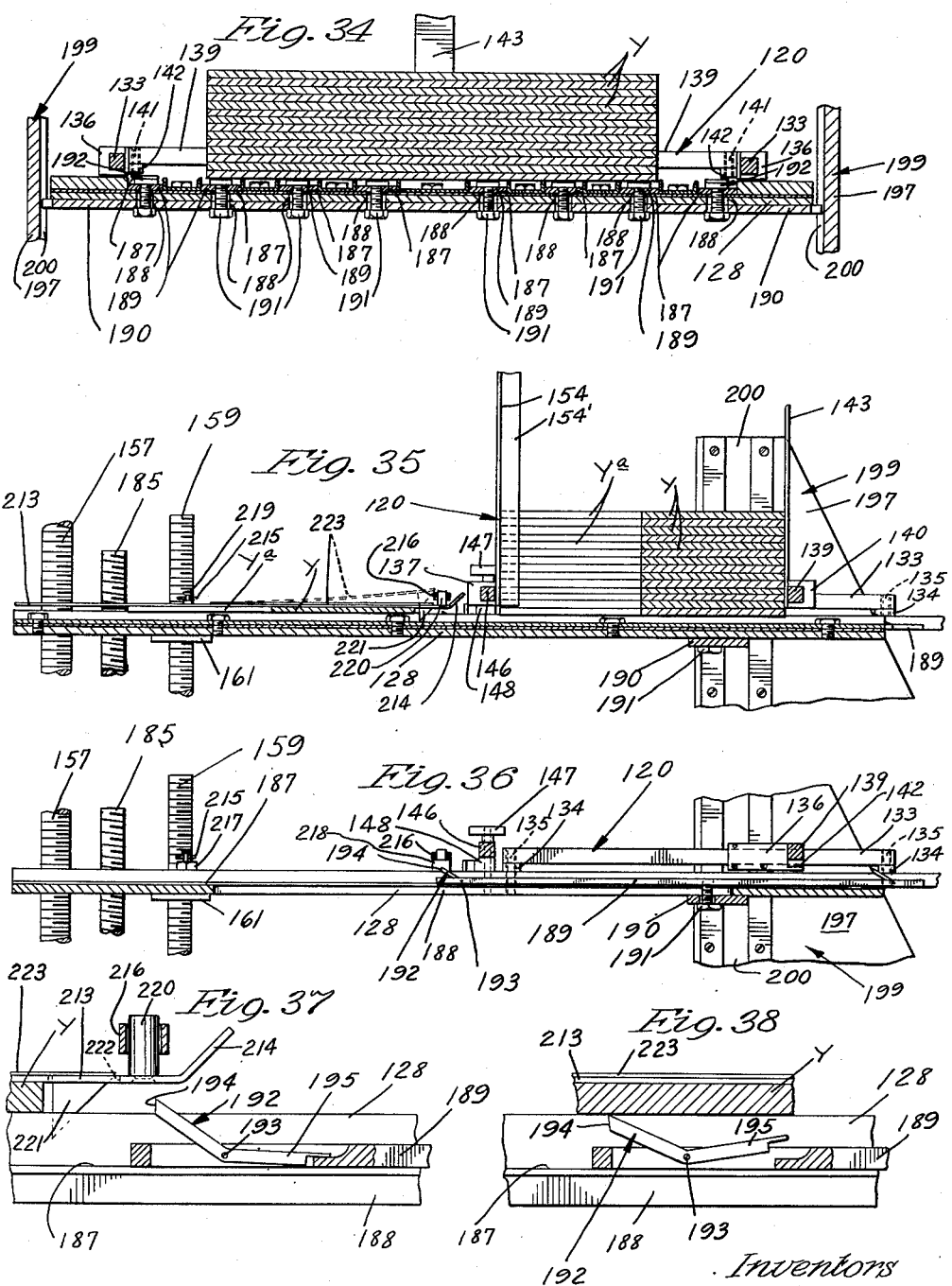

April 27, 1954
A. W. BAKER ET AL
2,676,522
CELL CASE PARTITION ASSEMBLING MACHINE
Filed May 7, 1949
15 Sheets-Sheet 15
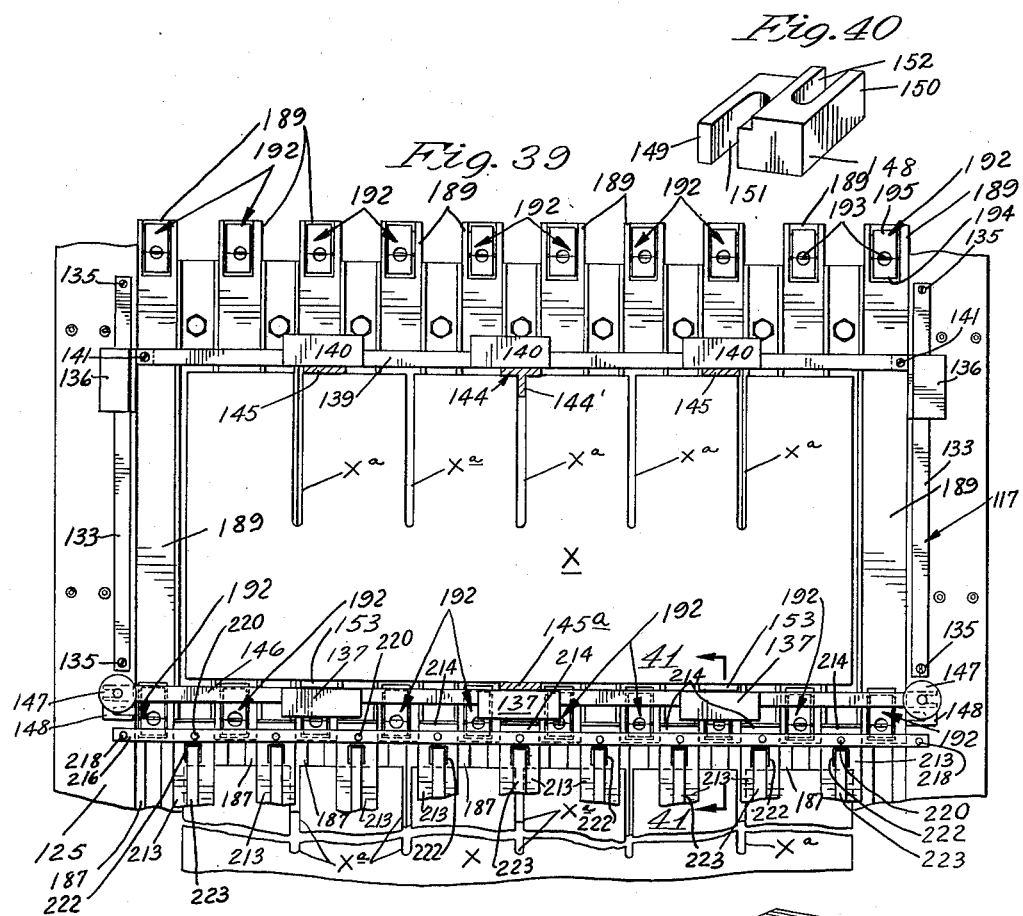
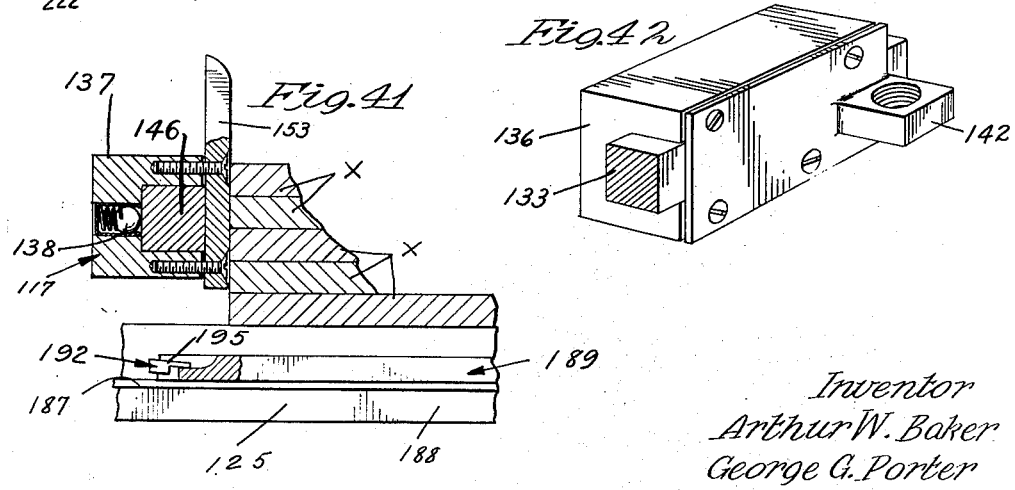
Inventor
Arthur W. Baker
George G. Porter
By their Attorneys Patented Apr. 27, 1954

2,676,522

UNITED STATES PATENT OFFICE 2,676,522

CELL CASE PARTITION ASSEMBLING MACHINE

Arthur W. Baker, Excelsior, Minn., and George G. Porter, Miami, Fla., assignors to The J. H. Mayhew Company, Excelsior, Minn., a corporation of Minnesota Application May 7, 1949, Serial No. 91,988

11 Claims. (Cl. 93—38)

Our invention relates to improvements in machines for assembling cell case partitions into crossed assembled relationship to form cell case cores, which, when placed in suitable cases or containers divide the interiors of their respective cases or containers into pluralities of compartments to form completed cell cases.

Generally stated, the invention consists of novel devices, combination of devices and arrangement of parts hereinafter described and defined. More specifically, it may be stated that the instant invention relates to improvements on and modifications of the machine for like purposes illustrated and broadly claimed in the application of George G. Porter, filed in the United States Patent Office on October 13, 1947, under Serial No. 779,432, and entitled "Cell Case Partition Assembling Machine." Hence, all the objects, advantages and important features of the Porter invention, as set forth in the preamble to the specification of his co-pending application, Serial No. 779,432, are common to the instant invention, which latter has numerous advantages and objectives peculiar unto itself.

An important object of the instant invention is to decrease the cost of production of cell case partition assembling machines of the general characted disclosed in the above-identified Porter application.

Another important object of the invention is to increase the accuracy, dependability, and life of machines of the general character disclosed in the aforesaid Porter application.

Another object of the invention is the provision of an improved structure greatly simplifying the operation of adjustably adapting machines of this character, to partitions of different dimensions, and particularly to partitions of different depths.

A still further important object of the invention is the provision of improved means or mechanism for automatically ejecting assembled cell case cores from the holders at the completion of each assembly operation.

The machine of this application also embodies important improvements in partition feeding or dispensing mechanism, which has been fully disclosed and claimed in a divisional application filed by us on November 24, 1950, under Serial No. 197,417.

The above and numerous other highly important objects and advantages of the invention will be made apparent from the following specification, claims, and appended drawings.

In the accompanying drawings, wherein a commercial embodiment of the invention is illustrated, like characters indicate like parts throughout the several views.

Referring to the drawings:

Fig. 1 is a perspective view, with some parts broken away and some parts shown in section, of a completed cell case core assembled from a plurality of pre-slotted cell case partitions by the machine of the instant invention;

Fig. 2 is a view in side elevation, with some parts broken away and some parts shown in section, of a commercial form of machine, built in accordance with the invention;

Fig. 3 is a front view, on a slightly enlarged scale, of the machine of Fig. 2, as seen looking from left to right with respect to Fig. 2;

Fig. 4 is a still further enlarged fragmentary detail view, with some parts broken away, and some parts sectioned, of part of the turret braking mechanism shown in Fig. 3;

Fig. 5 is a fragmentary perspective view, on a still further enlarged scale, of the front end portion of the machine comprising, mainly, the turret with its partition holders and braking mechanism;

Fig. 6 is a detail sectional view of the front end portion of the machine, taken on the irregular line 6—6 of Fig. 3 and being on an enlarged scale with respect to Fig. 3;

Fig. 7 is a greatly enlarged detail sectional view, taken on the line 7—7 of Fig. 6;

Fig. 8 is a rear end view of the machine, with some parts broken away;

Fig. 9 is a fragmentary view sectioned on the line 9—9 of Fig. 7;

Fig. 10 is a greatly enlarged detail view sectioned on the line 10—10 of Fig. 8;

Fig. 11 is a fragmentary detail view taken on the line 11—11 of Fig. 10;

Fig. 12 is a fragmentary detail view, taken on the section line 12—12 of Fig. 10;

Fig. 13 is a fragmentary detail sectional view, taken on the line 13—13 of Fig. 10;

Fig. 14 is a greatly enlarged detail fragmentary view, taken on the line 14—14 of Fig. 6;

Fig. 15 is a greatly enlarged detail fragmentary view, taken on the line 15—15 of Fig. 2;

Fig. 16 is a view corresponding to Fig. 15, but showing the parts in opposite extreme positions;

Fig. 17 is a greatly enlarged sectional view, taken on the line 17—17 of Fig. 16;

Fig. 18 is a greatly enlarged detail sectional view, taken on the line 18—18 of Fig. 16;

Fig. 19 is a greatly enlarged detail sectional view, taken on the line 19—19 of Fig. 16;

Fig. 20 is a greatly enlarged detail sectional view, taken on the line 20—20 of Fig. 16;

Fig. 21 is a greatly enlarged detail sectional view, taken on the line 21—21 of Fig. 8;

Fig. 22 is a somewhat enlarged fragmentary view taken on the line 22—22 of Fig. 8;

Fig. 23 is a sectional detail view taken on the line 23—23 of Fig. 21;

Fig. 24 is an enlarged fragmentary detail sectional view, taken on the line 24—24 of Fig. 2;

Fig. 25 is an enlarged fragmentary sectional view, taken on the line 25—25 of Fig. 2;

Fig. 26 is a greatly enlarged sectional view, taken on the line 26—26 of Fig. 2;

Fig. 27 is a still further enlarged fragmentary detail view, taken on the line 27—27 of Fig. 26;

Fig. 28 is a greatly enlarged fragmentary detail view, taken on the lines 28—28 and 28'—28' of Fig. 26;

Fig. 29 is an enlarged sectional view, taken on the vertical line 29—29 of Fig. 2;

Fig. 30 is a sectional view, taken on the line 30—30 of Fig. 29;

Fig. 31 is a greatly enlarged fragmentary detail sectional view, taken on the line 31—31 of Fig. 30;

Fig. 32 is a greatly enlarged fragmentary sectional view, taken on the line 32—32 of Fig. 30;

Fig. 33 is a greatly enlarged detail view, some parts broken away, taken on the horizontal line 33—33 of Fig. 29, and looking downwardly;

Fig. 34 is a sectional view, taken on the line 34—34 of Fig. 33;

Fig. 35 is a fragmentary sectional view, taken on the line 35—35 of Fig. 33;

Fig. 36 is a fragmentary sectional view, taken on the line 36—36 of Fig. 33;

Fig. 37 is a greatly enlarged detail fragmentary sectional view, taken on the line 37—37 of Fig. 33, with some parts omitted;

Fig. 38 is a view corresponding to Fig. 37, but showing another position of the parts;

Fig. 39 is a greatly enlarged fragmentary sectional view, taken on the horizontal line 39—39 of Fig. 29;

Fig. 40 is a greatly enlarged detail perspective view of one of the parts of the machine.

Fig. 41 is a greatly enlarged fragmentary detail view, taken on the line 41—41 of Fig. 39;

Fig. 42 is a greatly enlarged perspective view, with some parts broken away, of certain of the parts shown particularly in Fig. 39;

Fig. 43 is a fragmentary view, taken on the horizontal line 43—43 of Fig. 8;

Fig. 44 is an enlarged sectional view, taken on the vertical line 44—44 of Fig. 8; and Fig. 45 is a greatly enlarged fragmentary sectional view, taken on the line 45—45 of Fig. 24.

Fig. 46 is an enlarged detail sectional view taken on the line 46—46 of Fig. 45 with some parts broken away and some parts shown in section, illustrating structural details of the stop collars 35.

In the drawings, the main frame of the machine illustrated, comprises a rectangular base 1 and a super structure comprising a front plate 2, a rear plate 3, and an upper tubular support 4 extending between the front plate 2 and rear plate 3, and an intermediate tubular support 5, also extending between the front plate 2 and rear plate 3. Extending through the front and rear plates 2 and 3, respectively, and the tubular support 4, is a tubular turret shaft 6, which is journalled in and projects through bearings 7 and 8 mounted respectively on the plates 2 and 3. Mounted fast on the projected front end of the turret shaft 6 is turret-type conveyor, indicated as an entirety by 9. In the embodiment of the invention herein illustrated, the turret conveyor 9 is in the nature of a wheel comprising a hub 10, four spokes or arms 11 spaced 90° apart, and a rim 12, which latter serves as a brake drum.

By reference particularly to Figs. 3 and 5, it will be seen that the radial spokes or arms 11 of the turret wheel, together with the rim 12, define four circumferentially-spaced openings 13 in the turret wheel. Also by reference, particularly to these Figs. 3 and 5, it will be seen that the conveyor wheel 9 carries four like groups 14 of partition holders, and which groups are spaced 90° apart. Each of these groups 14 of partition holders comprises three sets of holders, respectively indicated by 15, 16 and 17, and each of which sets of holders is adapted to receive and support a different individual partition of a laterally-spaced group of three thereof.

As illustrated herein, the set of holders 15 comprises five individual spring clip holders 15', the set of holders 16 comprises five individual clip holders 16', and the set of holders 17 comprises five individual spring clip holders 17'.

The several individual holders 15', 16' and 17' each comprise four elongated spring fingers 18 that are mounted at their front ends on an adjustably slidable head 19, and have diverging free rear end portions providing receiving mouths for partitions fed horizontally thereto while disposed either horizontally or vertically. In the arrangement illustrated, the head 19 of each holder 15', 16' and 17' of each of the holder sets 15, 16 and 17 of each group 14 is slidably mounted on a different one of a laterally-spaced group of mounting bars 20, there being a group of mounting bars 20 for each group 14 of holders, and each of which groups of bars 20 extends across a different turret wheel opening 13. The several heads 19 are adapted to be locked in adjusted positions by means of set screws 21, and by adjusting the heads 19 on the mounting bars 20, it is easy to vary the lateral spacing between the holder groups 15, 16 and 17, and to obtain alignment between each of the holders of each group.

The mounting bars 20 are each provided at one end with a slide head 22, and its other end with a set screw-equipped slide head 23. The slide heads 22 and 23 are respectively mounted on laterally-spaced parallel rails 24, and are adapted to be locked in adjusted positions thereon by the set screws 25, acting through wedge blocks 26. By varying the spacing between the mounting bars 20, the groups of holders 15, 16 and 17 may be adjusted to accommodate partitions of different lengths and slot spacings. The rails 24 are rigidly mounted on the turret at opposite ends and portions, as best shown at 27 in Figs. 3, 6 and 8.

The spring clip holders 15', 16' and 17' are adapted to receive to different depths partitions fed edgewise thereto, in this case, the depth to which partitions are fed into the holders being dependent upon the depths of the partitions themselves. For limiting the depth to which partitions may be fed into the friction type spring clip holders 15', 16' and 17', and for use in ejecting such partitions from the holders, we provide, as an important feature of the instant invention, combined back-stops and ejecting devices 28 of which, in accordance with the present illustration, there are a group of four for each group 14 of partition holders. These devices 28 are all carried by the turret conveyor wheel 9 and work between the mounting bars 20. Each back-stop and ejecting device 28 of each group thereof has a partition engaging portion 29 that is orientated between the mounted front ends and receiving rear ends of the holders 15′, 16′ and 17′, and which portion 29 cooperates with the holders of each of the groups of holders 15, 16 and 17 for the purposes of limiting the movements of the partitions into the holders and for ejecting the same from the holders. The several backstop and ejecting devices 28 of each group thereof have their forwardly extended ends mounted on the conveyor through the medium of set screw-equipped sliding blocks 30, a slotted mounting head 31, and a pair of laterally parallel guide rods 32 having their rear ends mounted fast in the turret wheel. The forward ends of the devices 28 are mounted fast in the blocks 30 and said blocks 30 are slidably mounted in the slotted head 31 for adjustments toward and from one another to vary the lateral spacing therebetween. By reference, particularly to Figs. 3, 5 and 6, it will be seen that the set screws 33 of slide blocks 30 work through a common slot 34 in the guide heads 31. Forward sliding movements of the slotted heads 31 on the guide rods 32 are adjustably but positively limited by set screw stop collars 35 on said rods 32, the collars 35 being adjusted to positions determined by the varying depths of partitions being operated on by the machine. In the arrangement illustrated the slotted guide heads 31 are yieldingly biased in a forward direction toward said stop collars 35 by coil compression springs 36 mounted on the guide rods 32, see particularly Figs. 5 and 6. It will now be seen, particularly by reference to Figs. 5 and 6, that the devices 28, when in their normal positions shown, serve as stop devices for positively but adjustably variably limiting the depth partitions may be inserted into the spring clip holders 15′, 16′ and 17′, and it will further be seen by reference to said figures that these devices 28 may be moved rearwardly against the biasing action of springs 36 to eject partitions from the holders. The mechanism for periodically imparting such ejecting movements to the devices 28 will be later described. By reference to Figs. 7 and 9, it will be seen that the slotted mounting heads 31 are slidably mounted upon the guide rods 32 through the medium of anti-friction roller bearings 37, so as to insure free action of these backstop and injecting devices 28.

The turret conveyor 9 is intermediately driven in a clockwise direction with respect to Figs. 3 and 5 to bring the same successively into four different index positions spaced 90° apart. In each of these four index positions of the turret, a different turret carried group of partition holders 14 will be located in an assembly zone or station A (see particularly Figs. 3 and 5); another group of turret mounted partition holders 14 angularly spaced 90° from the first said group thereof in a clockwise direction will be located in an assembly zone or station B (see particularly Figs. 3 and 5); and another group of holders 14 angularly spaced from the last noted group of holders 90° in a clockwise direction will be located in an ejector zone C. As an aid in locating these so-called zones or stations on the drawings, the receiving zone or station is boxed in by broken lines A, see Figs. 3, 5 and 8, the assembly zone or station is boxed in by broken lines B in said figures, and the ejector zone or station is boxed in by broken lines C in said Figs. 3, 5 and 8.

The turret 9 is intermittently rotated in the manner just above described from a suitable source of power such as an electric motor M through power transmission and control mechanism as follows: Mounted fast on the shaft 38 of motor M is a belt pulley 39 which drives a belt 40 running over and driving a smaller pulley 41 fast on a suitably journalled shaft 42, see particularly Fig. 24. The shaft 42 drives a low speed power shaft 43 through conventional speed reducing mechanism, not shown, but contained within a gear box 44. The shaft 43 comprises an intermediate section and two end sections suitably connected thereto by suitable conventional couplings 45, and one end portion of the shaft 43 is suitably journalled in the gear box 44 and the other end portion of the shaft 43 is journalled in a gear box 46, see particularly Fig. 24. The low speed shaft 43 drives a short crank shaft 47 through conventional transmission mechanism, not shown but contained within gear box 46, see particularly Figs. 2 and 24. The crank shaft 47 is driven in a clockwise direction with respect to Fig. 24 and by reference to said figure and Fig. 2, it will be seen that this crank shaft 47 is journalled at one end in a bearing 48 carried by the gear box 46 and at its intermediate portion by a bearing 49 carried by the back plate 3 of the base of the machine. Mounted fast on the projected rear end of the crank shaft 47 is a crank 50 (see particularly Figs. 2 and 8) which operates an upwardly extended gear rack 51, shown best in Figs. 8, 15 and 16. This gear rack 51 meshes with a gear segment 52 that is journalled on the projected rear end of the turret shaft 6 through the medium of the hub 53 of a circular indexing flange 54. By reference particularly to Fig. 17, it will be seen that the gear segment 52 is axially journalled on the hub 53 of indexing flange 54 and that the said hub 53 is keyed fast on the turret shaft 6, at 55. The turret shaft 6 is tubular and is journalled in the bearings 7 and 8 and extends through the tubular support 4, see particularly Figs. 2 and 17. As previously indicated, the hub 10 of the turret wheel 9 is mounted fast on the projected front end of the turret shaft 6. With the turret driving mechanism thus far described, the gear segment 52 which floats upon turret shaft 6 is oscillated through an arc of 90° for each rotation of crank shaft 47, see particularly Figs. 8, 15 and 16, Figs. 8 and 15 showing the crank 50, gear rack 51, and gear segment 52 in one extreme position and Fig. 16 showing said gear rack 51 and gear segment 52 in the opposite extreme position. The gear segment 52 drives the indexing flange 54 and turret shaft 6 only during its 90° movement from its position of Fig. 16 to its opposite extreme positions of Figs. 8 and 15 by virtue of a spring engaged cam released clutch mechanism, indicated as an entirety by 56, see particularly Figs. 15 and 16 and 17. The turret driving clutch mechanism 56 (Figs. 15 to 17 inclusive) comprise a spring pressed clutch dog 57 which is engageable in any one of four circumferentially spaced indexing notches 58 in the indexing flange 54 and which notches are angularly spaced 90° apart. The bolt-like clutch dog 57 is radially slidably mounted in a guide way defined by a clutch mounting 59 fast on the gear segment 52, see particularly Figs. 15, 16, 17 and 20, and is inwardly spring pressed toward the indexing flange 54 by a coil compression spring 60. The clutch dog 57 is normally engaged in one of the indexing notches 58 and is so engaged during the entire downward movement of the gear rack 51. At the time, or just slightly prior to the time, the gear rack 51 reaches its lowermost position at the end of the downward turret operating stroke of said rack and its driven segment 52, the clutch dog 57 is retracted from its engaged indexing notch 58 by oscillatory clutch releasing arm 61 having an adjustable pusher head 62 which engages the radially inner edge of a flange 63 on the bolt-like clutch dog 57. The oscillatory clutch releasing arm 61 is intermediately pivoted at 64 and at its lower end is provided with a head 65 which is subject to the action of a roller 66 carried by the free end of a rotary arm 67 mounted fast on shaft 47, see particularly Figs. 2 and 8. With the arrangement just described, the clutch dog 57 will be retracted from an engaged indexing notch 58 once for each rotation of shaft 47 and once for each 90° of movement of turret shaft 6. Of course, the roller 66 engages the head 65 of the oscillatory clutch releasing arm 61 for only a few degrees of rotation on arm 67 and for only sufficient angular movement of gear segment 52 to permit movement of the latch dog 57 out of registration with the previously engaged notch 58.

By reference particularly to Figs. 8, 15, 16 and 18, it will be seen that the oscillatory clutch releasing arm 61 is actually operated in a clutch releasing direction by the roller-equipped rotary arm 67, but is automatically returned to its clutch engaged position by a coil compression spring 68 operating through a hollow plunger 69 slidably mounted in a bracket flange 70 fast on the frame of the machine as illustrated. The spring 68 is mounted on a plunger rod 71 fast on the closed end of the hollow plunger 69, see Fig. 18. Extreme movements of the oscillatory clutch releasing arm 61 in a clutch releasing direction are dampened by an adjustable rubber buffer 72, shown best in Fig. 18.

The gear rack 51 is maintained in mesh with the gear segment 52 by a pair of guide rollers 73 journalled on the free end portions of a rocker frame 74 that is pivoted on the hub 75 of gear segment 52 (see particularly Fig. 17).

Positive indexing of the turret in each of its four indexed positions or stations is accomplished by a spring pressed indexing plunger 76 (see Figs. 15, 16 and 19) that is slidably mounted in a bearing 77 mounted fast on a bracket 78 projecting from the rear plate of the main frame of the machine. The free end of the spring pressed indexing plunger 76 is sized to fit snugly in any one of the four indexing notches 58, and is spring pressed toward the indexing flange 54 by a compression spring 79, shown best in Figs. 15 and 16. The spring pressed indexing plunger or bolt 76 rides on the circular face of the indexing flange 54 during the major part of each 90° movement thereof, and is spring pressed into a cooperating indexing notch 58 each time such a notch comes into registration therewith. Retraction of the indexing bolt or plunger 76 from the cooperating indexing notches 58 at the initiation of each 90° of rotation of the indexing flange is accomplished by a cam 80 fast on and projecting radially from gear segment 52, and a cooperating latch retracting roller 81 journalled on indexing plunger 76 through the medium of a spindle 82 anchored in the plunger 76 and working in a suitable slot in the bearing 77. With this arrangement, the indexing plunger 76 is mechanically and positively retracted from an engaged indexing notch 58 just prior to the initiation of each 90° movement of indexing flange 54, and is maintained mechanically retracted until out of registration with the last engaged notch 58. Reverse or counterclockwise movements of the indexing flange 54 are positively prevented by a spring pressed pawl 83 shown best in Figs. 15, 16 and 17. Of course, this also prevents any reverse movement of the turret shaft 6 and parts carried thereby.

Because the turret is crank-operated, and because each 90° movement of the turret commences with the crank at dead center and ends with the crank at dead center, the speed of the turret will be gradually accelerated during the first half of each 90° movement and will be correspondingly gradually reduced during the latter half of each 90° movement, so that the speed of the turret will have been reduced close to zero at the time it reaches each of the four indexing positions. Hence, theoretically, at least, movement of the turret will have been reduced to, or close to, zero each time the indexing plunger comes into registration with an indexing notch 58. However, in practice, such an ideal condition is not usually obtainable without the use of auxiliary braking mechanism, since there is inevitably a certain amount of slack or back-lash and torsional shaft whip in the turret driving mechanism, which tends to permit the turret to slightly overrun during the speed-retarding half of each turret-operating cycle. For this reason, we preferably employ automatic turret braking mechanism which comes into play during the latter or speed-reducing half of each 90° operating movement of the turret, to prevent the inertia of the turret from taking up the slack in its driving mechanism, and which insures substantially zero motion of the turret at each indexing station. The braking mechanism herein illustrated is a material improvement over that illustrated in the before-identified Porter application, and will immediately be described. The brake proper comprises the brake drum-acting rim 12 of the turret 9 and a spring-actuated brake shoe 84 (see particularly Figs. 3, 4 and 5). The brake shoe 84 is segmental and is equipped with the usual friction facing 85. The shoe 84 is pivotally mounted at its intermediate portion, on the intermediate portion of arm 86 forming part of the brake releasing linkage. One end of the arm 86 is pivoted at 87 to a frame mounting bracket 88. The brake shoe 84 is yieldingly urged against the brake rim 12 of the turret by a pair of coil compression springs 89 to varying degrees of pressure determined by an adjustment bolt 90 and follower 91. The brake releasing linkage comprises the intermediately pivoted link 86, a laterally-spaced pair of rigid links 92, a crank 93 fast on an oscillatory shaft 94 that extends through the front and rear plates of the frame base and is suitably journalled therein, a cam-operated arm 95 fast on the rear end portion of oscillatory shaft 94 (see particularly Fig. 24), a cam following roller 96 fast on the free end of arm 95, and a cam 97 fast on short crank shaft 47. With the arrangement described, the brake is normally set by springs 89 and it is mechanically released during the speed-accelerating first half of each 90° movement of the turret, being then released by cam 97 and re-set by springs 89 during the speed-reducing latter half of each 90° movement of the turret. Actually, the brake remains spring-set during idle periods of the turret, and is cam-released just prior to the initiation of each 90° cycle of the turret.

The combined back-stops and partition ejectors for each group 14 of partition holders are automatically advanced rearwardly from their normal forwardly located stop positions to their rearwardly extended partition ejector positions; and returned back to their normal stop positions, once for each complete 360° movement of the turret, or once for each four 90° cycles of movement of the turret, this occurring each time a group of devices 28 and a cooperating group 14 of partition holders are at rest in the ejector zone C (see particularly Figs. 3, 5 and 8). In Fig. 5, it will be noted that the group of back-stop and ejector devices 28, located in the ejector zone C are shown as rearwardly advanced to their ejector positions, whereas the other three groups of devices 28 are shown in their normal stop positions. The mechanism for imparting such ejector movements alternately to the groups of devices 28, while the latter are in the ejector zone C, comprises a reciprocatory ejector shaft 98 concentrically mounted in and extending through the turret shaft 6, a radial arm 99 mounted fast on the front end of said reciprocatary ejector shaft 98 and carrying at its free end a plunger-acting head 100. The plunger-acting head 100 is so orientated that it will be opposed to the slotted mounting head 31 of each group of devices 28 when the latter are located in the ejector zone C, but is normally spaced from the planes of rotation of the heads 31. However, each time the turret comes to rest, the reciprocatory ejector shaft arm 98 and plunger 100 will be rearwardly advanced sufficiently to move the opposed head 31 and devices 28 carried by the latter from their normal stop positions to their rearwardly-extending ejector positions, and then retracted to permit the said engaged head 31 and its devices 28 to be returned by springs 36 to their normal stop positions. The mechanism for thus automatically imparting ejecting movements to the ejector shaft 98 comprises parallel links 101 pivoted at 102 to the rearwardly projected end of ejector shaft 98 and at their other or rear ends, to the upper end of a rock arm 103 at 104 (see particularly Fig. 2). The rock arm 103 is pivoted to a frame-supported bracket 105 at 106 and is intermediately pivoted to a rigid link 107 (see Fig. 2) at 108. This link 107 is intermediately supported by a rock arm 109. At its free end (see Fig. 45), the link 107 is equipped with a cam-following roller 110, that rides on a cam 111 fast on the intermediate portion of low-speed shaft 43 (see Figs. 24, 25 and 45). The roller-equipped end 110 of link 107 is yieldingly biased into engagement with the cam 111 by a coil tension spring 112 acting through rock arm 103 (see Fig. 2). The rear end of spring 112 is anchored to rock arm 103 and the front end portion of said spring is anchored at 113 (see Figs. 2 and 29) within the square tubular member 5 in which the front and intermediate portion of said spring operates.

To lock the reciprocatory ejector shaft 98 against rotation, the pivot pin 103 is laterally extended in one direction, as shown best in Fig. 22, and is provided at its free end with a roller 114 that works in a forwardly and rearwardly extending generally horizontal guideway 115 defined by a frame-carried bracket 116.

By reference now to Fig. 1, it will be seen that the completed cell case core therein illustrated is made up of a laterally spaced group of pre-slotted cell case partitions X, X' and X'', which are in crossed assembled relationship with a laterally spaced group of cell case partitions Y, Y', Y'', Y''', and Y''''. The cell case partitions X, X' and X'' are provided with laterally spaced slots Xa for receiving partitions Y, Y', Y'', Y''', and Y'''', and the cell case partitions Y, Y', Y'', Y''', and Y'''' are formed with slots Ya for receiving partitions X, X' and X'', these several parts all being of the conventional pre-slotted variety.

For delivering or feeding cell case partitions X, X', and X'' to the sets of holders 15, 16 and 17, respectively, of each group 14 of holders while the latter are respectively indexed in their receiving zone A, we provide a group A' of cell case partition dispensers which are individually indicated as entireties by 117, 118 and 119, respectively; and for delivering or feeding cell case partitions Y, Y', Y'', Y''' and Y'''' into positions of crossed assembled relationship with partitions X, X' and X'', held by the sets of holders 15, 16 and 17, respectively, of each group of holders 14, while the latter are respectively indexed in an assembly zone or station B, we provide a group B' of cell case partition dispensers which are individually indicated as entireties by 120, 121, 122, 123 and 124. The group A' of dispensers are located immediately rearwardly adjacent the receiving zone A, and the group B' of dispensers are located immediately rearwardly adjacent the assembly zone B. The dispensers 117 to 124, inclusive, each comprise a magazine portion for a stack of cell case partitions and an underlying reciprocating pusher type conveyor mechanism. The bottom of the magazine portion of the dispenser 117 is formed by a table 125, the bottom of the magazine portion of the dispenser 118 is formed by a table 126, the bottom of the magazine portion of the dispenser 119 is formed by a table 127, the bottom of the magazine portion of the dispenser 120 is formed by a table 128, the bottom of the magazine portion of the dispenser 121 is formed by a table 129, the bottom of the magazine portion of the dispenser 122 is formed by a table 130, the bottom of the magazine portion of the dispenser 123 is formed by a table 131, and the bottom of the magazine portion of the dispenser 124 is formed by a table 132. Other parts of the magazine portions of dispensers 117 to 119, inclusive, of dispensers group A' are identical, and other parts of the magazine portions of dispensers 120 to 124, inclusive, of dispenser group B' are substantially identical to those of group A', differing from the former mainly in matters of dimension and spacing of parts and other minor details which will later be made apparent.

The magazine portions of the dispensers 117 to 124 inclusive, respectively, each further comprise forwardly and rearwardly extending laterally spaced slide bars or rails 133 mounted on opposite sides of their respective cooperating bottom forming tables 125 to 132, inclusive, respectively (see particularly Figs. 33, 34, 35, 36 and 39). By reference particularly to Figs. 35 and 36, it will be seen that the said guide bars or rails 133 are mounted fast on their respective cooperating tables adjacent their opposite ends through the medium of spacers 134 and anchoring screws 135, so that the intermediate portions of said guide rails or bars 133 are spaced above but are parallel to the upper surfaces of their respective tables. Adjustably slidably mounted on each of the laterally spaced rails or bars 133 are composite slide blocks 136, shown best in Figs. 33, 34, 36, 39 and 42. These slide blocks 136, while manually slidable on the bars or rails 133 are internally equipped with friction devices preventing accidental displacement from manually adjusted positions. These friction devices are not specifically shown in connection with slide blocks 136 but may assume to be the same as shown in connection with slide blocks 137, shown in detail in Fig. 41, and which friction devices each comprise a spring pressed ball 138 working against the cooperating guide bar or rail. The opposite slide blocks 136 of each magazine are rigidly connected by a transverse guide bar or rail 139, see particularly Figs. 33, 34 and 39. Slidably mounted on the guide bar or rail 139 of each of the magazines 120 to 124, inclusive, of the dispenser group B' is a single composite slide block 140 which is substantially identical to the slide block 136. In the magazines 117 to 119, inclusive, of dispenser group A', there are three slide blocks 140 slidably mounted on the guide bar 139. By reference particularly to Figs. 33, 34, 36 and 39, it will be seen that the transverse guide bars or rails 139 are anchored fast at opposite ends to opposite slide blocks 136 through the medium of anchoring screws 141 and laterally inwardly projecting anchoring flanges 142 on the inner sides of blocks 136, the anchoring flanges 142 being peculiar to slide blocks 136. Carried by each slide block 140 of dispenser group B' is a flat upright partition guide post 143. Carried by the central guide block 140 of each magazine of dispenser group A' is a T-shaped upright guide post 144, see particularly Fig. 39, and carried by each of the two outside slide blocks 140 of each magazine of dispenser group A' is a flat upright guide post 145. Defining the front of each of the magazines 117 to 124, inclusive, of dispenser groups A' and B' is a transverse guide rail 146 which extends over and in spaced relationship to an underlying upper surface of a cooperating table. These guide rails or bars 146 are mounted fast on their underlying table adjacent their opposite ends through the medium of thumb screws 147 and shim blocks 148, shown in detail in Fig. 40. These shim blocks 148 are formed to provide relatively thin portions 149 and relatively thicker portions 150, the former being provided with an anchoring screw receiving slot 151 and the latter with an anchoring screw receiving slot 152. The spacing of the guide bars 146 from their respective underlying table surfaces may be varied to accommodate the machine to partitions of different thicknesses by merely reversing shim blocks 148 so as to bring their respective thin portions 149 or thicker portions 150 under the opposite ends of the rails 146. Slidably mounted on the guide rails or bars 146 over all magazines of dispenser groups A' and B' are three of the beforementioned slide blocks 137, shown in detail in Fig. 41. Carried by each of the two outside slide blocks 137 of each magazine of dispenser group A' are short flat guide posts 153. Carried by the center guide block 137 of each magazine in dispenser group A' is a tall flat guide post 145a corresponding to guide posts 145. Carried by the central slide block 137 of each magazine in dispenser group B' is a T-shaped upright guide post 154. Carried by each of the outside slide blocks 137 of each magazine in dispenser group B' is a tall flat upright guide post 143. The T-shaped guide posts 144 and 154 provide partition slot engaging flanges 144' and 145', respectively.

The three tables 125, 126, and 127 of dispenser group A' are independently vertically adjustably mounted on a common bed frame 155, and the five tables 128-132 inclusive of dispenser group B' are mounted for independent vertical adjusting movements on a similar common bed frame 156. The bed frames 155 and 156 are mounted fast on the base frame structure 1 of the machine. As best shown in Figs. 2, 29, and 30, the tables 127, 126, and 125 respectively of dispenser group A' are arranged in vertically spaced relationship to one another, the table 118 being directly over table 119 and table 117 being directly over table 118; and the tables 132, 131, 130, 129, and 128 of dispenser group B' are arranged in vertically spaced relationship, the table 131 directly overlying table 132, table 130 directly overlying table 131, table 129 directly overlying table 130, and table 128 directly overlying table 129. The vertically intermediate table 126 of dispenser group A' is directly but vertically adjustably supported from the cooperating underlying bed frame 155 by means of four long upstanding adjusting screws 157 that are anchored fast on the bed frame 155 at their lower ends. Each said screw 157 carries a worm gear-equipped adjusting nut 158 threaded thereon and underlying and directly supporting the intermediate table 126 of dispenser group A'. The lower and upper tables 127 and 125 of dispenser group A' are indirectly supported from the underlying bed frame 155 through the medium of intermediate table 126, its adjusting screws 157, and four adjusting screws or legs 159. The adjusting screws or legs 159 are each journalled for free rotation in the intermediate table 126 and are each held against axial movements therein by spaced bearing collars 160. The lower and upper tables 127 and 125 are directly supported from the screw-threaded legs 159 through the medium of nuts 161 screw-threaded on the said legs or screws 159 and anchored fast to the under sides of tables 127 and 125.

With the mechanism just described above, common vertical adjustments of the tables 125, 126, and 127 of dispenser group A' are made by means of four worms 162 cooperating with worm gear adjusting nuts 158, said worms 162 being fast on shafts 163 and mounted on intermediate table 126 by means of brackets 164, the rearward end of one of the shafts 163 being adapted to receive a hand-operated crank 165 (see Fig. 30). The forward ends of shafts 163 are connected for common rotation by two pairs of bevel gears 166 and a connecting shaft 167. The details of the elements 162, 163, 164, 166, and 167 are not shown in connection with the tables 125, 126 and 127 in dispenser group A', but are identical to correspondingly numbered parts fully shown in detail in connection with tables 128-132 inclusive of dispenser group B', hereinafter described, in Fig. 33. As will hereinafter be made apparent, partitions X' are fed edgewise of intermediate table 126 of dispenser group A' into the intermediate sets of holders 16 of a holder group 14 when the latter are positioned in the receiving zone A, as shown in Fig. 2. Vertical alignment of partitions X' fed over table 126 into sets of holders 16 is accomplished by imparting common vertical adjusting movements to the several tables 126, 125 and 127 of dispenser group A' through mechanism last above described.

Simultaneous variable spacing of tables 125 and 127 with respect to intermediate table 126 for the purpose of properly aligning tables 125 and 127 respectively with sets of holders 15 and 17 respectively of the holder group 14 located in the receiving zone A is accomplished by mechanism comprising the several screw-threaded legs 159 carried by intermediate table 126 and other mechanism as follows: It will be noted first that the upper and lower sections of screws 159, cooperating respectively with tables 125 and 127, have oppositely pitched screw threads (see Figs. 8 and 30), the former being right hand and the latter being left hand, for example, so that unidirectional rotation of the several screw-threaded legs 159 will cause movement of tables 125 and 127 in opposite directions. The several screw-threaded legs 159 are connected for common unidirectional rotation by suitable mechanism which, as shown, involves four pairs of intermeshing helical gears 168 and 169. The helical gear 168 of each pair of gears 168 and 169 is keyed on the extended lower end of a different screw-threaded leg 159 for common rotation therewith and free axial sliding movements thereon, see particularly Fig. 28. By reference to this Fig. 28, it will be seen that the extended lower end of each screw-threaded leg 159 is provided with a long keyway 170 that is slidably engaged by a key 171 of cooperating gear 168. Also, it will be noted by reference to Fig. 28 that the said keyway-equipped lower ends of screw-threaded legs 159 project downwardly through bed frame 156 and base frame 1. Each pair of helical gears 168 and 169 is journalled in and held against axial movements in a gear case 172 anchored to bed frame 156 by anchoring bolts or the like 173, see particularly Fig. 28.

The four gears 168 are driven in common from a suitable source of power, such as an electric motor 174, through power transmission mechanism comprised as follows, to wit: A pulley 175 (see Figs. 2 and 24), a V-belt 176 running over pulley 175 and a pulley 177 fast on a shaft 178. The shaft 178 (see Figs. 24 and 26) is journalled in bearing brackets 179 on bed frame 155 and carries at its opposite ends worms 180 each meshing with a worm gear 181 (see Fig. 24). The worm gears 181 are each mounted on one end of a different shaft 182. Said shafts 182 each journalled adjacent their rear ends in bearing brackets 183 and their intermediate and forward end portions are journalled in gear cases 172. The electric motor 174 is of the reversible type, from which it will be apparent that operation of the motor in one direction will produce simultaneous adjusting movement of upper and lower tables 125 and 127 away from the intermediate table 126, the former upwardly and the latter downwardly, whereas operation of the motor 174 in the opposite direction will result in simultaneous movement of tables 125 and 127 toward the intermediate table 126, the former moving downwardly and the latter moving upwardly, the last-described adjusting movements of the tables 125 and 127 serving to respectively bring about cooperative alignment therebetween and sets of holders 15 and 17 of the holder group 14 located in the receiving zone A.

The tables 128 to 132, inclusive, respectively, of dispenser group B' are arranged one above the other, and above cooperating underlying bed frame 156 in the manner described in connection with tables 125 to 127, inclusive, and bed frame 155 of dispenser group A', the major difference being that there are a total of five tables in dispenser group B', as compared to three in dispenser group A'. The several tables 128 to 132, inclusive, of dispenser group B' are mounted for common vertical adjusting movements in substantially the same manner as are the tables 125 through 127 of dispenser group A', and elements corresponding to elements described in connection with dispenser group A' are assigned like characters. The upper table 128 and lower table 132 of dispenser group B' are supported from underlying bed frame 156 through the medium of central table 130, and are arranged for simultaneous vertical adjusting movements in opposite directions with respect to bed frame 156 and central table 130, all through the medium of supporting and driving elements previously described in connection with tables 125 and 127 of dispenser group A', and which are indicated by characters assigned to like elements or parts in dispenser group A', except for the electric motor power source, which is indicated by 184 in connection with the table adjusting elements of group B'. The upper intermediate table 129 and the lower intermediate table 131 of dispenser group B' are mounted from the underlying bed frame 156 for simultaneous vertical adjusting movements in opposite directions with respect to central table 130 and underlying bed frame 156 through driving connections comprising four upwardly and downwardly extending screw-threaded legs 185, and two short downwardly extended screw-threaded legs 186 journalled in central table 130 and held against axial movements therein by spaced bearing collars 160 (see particularly Fig. 30). At this point, attention is called to the fact that there are six screw-threaded legs 157 and 159 in dispenser group B', as compared to a total of four screw-threaded legs 157 and 159 in dispenser group A'. One of the shafts 163 in dispenser group B' is squared at its rearward end to receive the crank 165, shown in Fig. 8, or an equivalent crank, not shown, for the purpose of imparting simultaneous or unitary vertical adjusting movements to the group of tables 128 to 132, inclusive, of dispenser group B'. Usually, this simultaneous adjustment of the several tables 128 to 132 inclusive is for the purpose of establishing initial alignment between central table 130 and the aligned slots Xa of a group of partitions held by a group of holders 14 located in assembly zone B, and for also aligning such partitions with holders 15', 16', 17' of a group 14 of holders in the assembly zone B. This is, of course, when all of the tables 128 to 132, inclusive, and all of the holder sets 15, 16 and 17 are being utilized. However, it should be appreciated that when a lesser number of tables 128 to 132, inclusive, are being utilized, initial alignment of table 130 may be with other than the central holders of the holder group 14 located in the assembly zone B, and with other than the central aligned slots of partitions in the assembly zone. By reference to the drawings, it will be noted that the six screw-threaded legs 159 of dispenser group B' are each provided with a pair of helical gears 168 and 169 and gear case 172.

The screw-threaded legs 185 and 186 supporting upper and lower intermediate tables 129 and 131 are connected for simultaneous unidirectional but half-speed vertical adjusting movements thereof and tables 129 and 131 with respect to the upper and lower tables 128 and 132 and their respective supporting legs 159, by gearing from each of the screw-threaded legs 159. This gearing comprises spur pinion gears 235 each fast on a leg 159 (see particularly Figs. 30 and 31), and speed-reducing gears 236 each fast on adjacent screw-threaded legs 185 and 186. The speed reduction ratio between gears 235 and 236 is two to one so that the upper and lower intermediate tables 129 and 131 will partake of vertical adjusting movements simultaneously with upper and lower tables 128 and 132, but at one-half the speed of the latter.

It should also be noted that the direction of rotation of screw-threaded legs 185 and 186 is opposite to that of legs 159, which requires that the threads of legs 185 and 186 be oppositely pitched with respect to the threads of legs 159, so as to insure unidirectional movements of tables 129 and 131 with respect to tables 128 and 132.

The laterally intermediate portion of each of the several tables 125, 126, and 127 in dispenser group A' and each of the tables 128–132 inclusive in dispenser group B' rearwardly terminates in a vertical plane defining the rear of its respective magazine 117, 118, 119, 120, 121, 122, 123, or 124. In this respect, it may be said that it is only the laterally spaced edge portions of the tables which in some cases extend rearwardly of the planes of their respective cooperating magazines. By reference particularly to Fig. 2, it will be seen that the magazines 117, 118, and 119 of dispenser group A' are staggered and are located progressively closer to the rear of the machine from top toward bottom, and that the magazines 120–124 inclusive of dispenser group B' are staggered and are located progressively closer toward the rear of the machine from top toward bottom.

The tables 125, 126, and 127 of dispenser group A' and the tables 128–132 inclusive of dispenser group B' are composite structures each formed to provide a laterally spaced parallel plurality of forwardly and rearwardly extending elongated guideways or channels 187 in their upper surfaces and forwardly and rearwardly elongated slots 188 opening through the bottoms of said guideways or channels 187.

The reciprocating pusher type conveyor or dispenser mechanism for each table 125, 126, and 127 and 128–132 inclusive in dispenser groups A' and B' comprises an elongated pusher bar 189 located in each of the table guideways or channels 187. The pusher bars 189 of each table are tied together for common forward and rearward reciprocating movements by a transverse tie bar 190 working slidably against the under surface of its respective table and rigidly connected to each pusher bar 189 of its respective table by head-equipped bolts 191 working therethrough and through the table slots 188 and screw-threaded each into an overlying pusher bar 189. Each pusher bar 189 is provided (see particularly Figs. 36, 37, and 38) with a longitudinally spaced plurality of partition-engaging pushing pawls 192, the number of pawls 192 for each pusher bar depending upon the length of the cooperating table, and the spacing between pawls 192 of a common bar 189 being greater than the depth of the deepest partition capable of handling in a cooperating magazine so as to insure definite spacing between successive partitions being fed over a common table. The pawls 192 are intermediately pivoted at 193 and comprise partition-engaging front end portions 194 and weighted rear end portions 195 yieldingly biasing the front end portions 194 into their upper operative positions shown in Fig. 37. By reference to Fig. 37, it will be seen that when the pawls 192 are in their operative positions, their free ends 194 extend above the upper surface of their cooperating tables (tables 128 and others) so that they will engage the rear edges of a partition Y or X, X', X'', Y', Y'', Y''', Y'''' located on respective cooperating tables. The pusher bars 189 of all tables 125–132 inclusive are all subject to continuous forward and rearward reciprocation by mechanism hereinafter described so that the end 194 of the pawl 192 of each pusher bar of each table engages the rear edge of a different partition and imparts a pre-determined step of forward movement to an engaged partition for each reciprocation. The pawls 192 of each table are arranged in laterally aligned groups and the rearmost group of pawls 192 of each table always engages the rear edge of the bottom partition of a stack of partitions X, X', X'', Y, Y', Y'', Y''', or Y'''' contained in its respective cooperating magazine 117, 118, 119, 120, 121, 122, 123, or 124. By reference to Fig. 38, it will be seen that the partition-engaging front ends 194 of the pawls 192 slide under the cooperating partitions (partition Y and others) during the rearward return strokes of the pusher bars 189 and said pawls.

The transverse tie bars 190 of the three tables 125, 126 and 127 of dispenser group A' are connected for common forward and rearward reciprocating movements by a pusher head 196 comprising laterally spaced vertical head plates 197, which are secured together at their bottom ends by a transverse tie plate 197' and angle irons and bolts 198, shown best in Figs. 26 and 29. The tie bars 190 of tables 128, 129, 130, 131, and 132 of the dispenser group B' are similarly tied together for common forward and rearward reciprocation by a pusher head 199, also comprising laterally spaced side plates 197 and are secured together at their lower ends by transverse tie plates 197' and bolts and angle irons 198. The head plates 197 define opposed vertical guideways 200, which receive opposite free ends portions of the tie bars 190 (see Figs. 30 and 33 to 36 inclusive). The free ends of the tie bars 190 are slidable in their respective cooperating guideways 200, so that all of the tie bars 190 of dispenser group A' will be connected to the respective heads 196 or 197 for common forward and rearward reciprocation, while leaving the individual tables free for independent vertical adjustments therein. The pusher heads 196 and 199 are each mounted for forward and rearward reciprocation in parallel relation to their respective cooperating tables by means of a laterally spaced forwardly and rearwardly pair of guide rods 201 and split bearing blocks 202 of which there are two for each rod 201, and which bearing blocks are anchored to the undersides of tie plates 197' (see particularly Figs. 26 and 29). Each pair of rods 201 is rigidly mounted on the base frame 1 by means of anchor bars 203 and anchor bolts 204. The pusher heads 196 and 199 are reciprocated in common from the slow-speed power shaft 43 through power transmission connections comprising a crank 205 fast on one projected end of shaft 43 (see particularly Fig. 24), a pitman arm 206 driven by crank 205, and a rock arm 207 fast on a rock shaft 208 (see Figs. 2, 24, and 25). In Fig. 24, the crank 205 and pitman arm 206 are shown in two positions, one by full lines and the other by dotted lines. The rock shaft 208 extends transversely of the machine (see Fig. 25) and is journalled adjacent its ends to the main base frame 1 in spaced bearing brackets 209, and carries for common rocking movements therewith a pair of like cranks 210, one of which is connected to pusher head 196 by a pitman arm 211 and bracket 212, and the other of which is connected to pusher head 199 by a corresponding pitman arm 211 and corresponding bracket 212.

For the purpose of holding partitions X, X', X'', Y, Y', Y'', Y''', and Y'''' in face to face contact with the underlying surfaces of tables 125 to 132, inclusive, respectively, during their feeding movements thereover, we provide yielding hold-down mechanism as follows: This yielding hold-down mechanism for each of the several tables comprises a plurality of laterally-spaced parallel hold-down shoes 213 for each table 125 to 132, inclusive, respectively. These elongated hold-down shoes normally bear upon the uppermost surfaces of tables 125 to 132, inclusive, respectively, intermediate the guide channels 187 of said tables and extend longitudinally of the machine from points immediately forwardly of the magazines 117 to 124, inclusive, respectively, approximately to the front extremities of the respective cooperating tables (see particularly Figs. 29, 33 and 35). At their rear ends adjacent their respective cooperating machines, the elongated hold-down shoes 213 are upturned at 214 (see Figs. 35 and 37) to facilitate insertion of partitions therebetween and the uppermost surfaces of the tables. The hold-down shoes 213, being subject to the yielding action of gravity, bear upon the partitions during their forward movements from the magazines to their points of delivery, and keep the same firmly pressed against the underlying uppermost surfaces of the tables, thereby insuring constant engagement of the rear edges of the partitions with the front ends 194 of pusher pawls 192. The several hold-down shoes 213 of each of the tables are anchored to their respective table and to one another at their front end portions by a common transverse anchoring strap 215, and adjacent their rear end portions by a common transverse anchoring bar 216. The anchoring straps 215 are flexible and elastic, being preferably made of rubber, synthetic rubber or the like, and the anchoring bars 216 are of metal and are relatively rigid. The elastic straps 215 extend transversely over the several cooperating hold-down shoes 213 and are anchored at their opposite end portions to an underlying table by a rivet or the like, as at 217, and are anchored to each of the several underlying hold-down shoes 213 by a rivet or the like 219. The hold-down bars 216 similarly extend transversely across and span the several cooperating hold-down shoes 213 and are anchored at their opposite end portions to an underlying table by shoulder anchoring pins 218, and are anchored to each of the several underlying hold-down shoes by an upstanding anchoring post 220. The hold-down bars 216 are gravity seated on the shoulders of the anchoring pins 218, which maintain said bars spaced above the underlying shoes 213. The hold-down shoe-carried anchoring posts 220 vertically float in suitable receiving orifices in the bars 216 so that the rear ends of the shoes 213 are free for independent vertical movements, one with respect to the other. Of course, with the structure described, the bars 216 positively anchor the hold-down shoes 213 against movements in a horizontal plane while allowing limited independent movements of the rear end portions of the shoes, and the elastic anchoring straps 215, being relieved of excessive strain in a horizontal direction by the bars 216, maintain the front end portions of the hold-down shoes 213 against excessive movements in a horizontal plane, while leaving the front ends of said hold-down shoes 213 free for relatively great upward and downward movements, one with respect to the other. This manner of anchoring the hold-down shoes has been found to be very important in a machine of this kind, which very often works with paper partitions that are subject to imperfections, sometimes resulting in a tendency to produce a jamming or bunching-up of paper under the hold-down shoes. When this happens, the hold-down shoes, mounted as described, and particularly the front end portions of said shoes, are free to move upwardly to relieve the strain, and may be readily lifted for the purpose of removing the material causing the disturbance.

To positively prevent rearward movements of the partitions during intermittent rearward movements of the pusher bars 89 and their pawls 192, we provide anti-reversing mechanism as follows: The said anti-reversing mechanism for each table comprises at least one partition-engaging pawl 221 yieldingly carried by the hold-down shoe 213 of each of the several tables. The pawls 221 (see particularly Figs. 33, 35 and 39) work downwardly through suitable apertures 222, and are each yieldingly mounted on a cooperating hold-down shoe 213 by means of a leaf-mounting spring 223. The leaf-mounting springs 223 extend longitudinally of their respective cooperating hold-down shoes 213 and are anchored fast thereto adjacent their front end portions, but are otherwise free of their respective cooperating hold-down shoes for upward movements with respect thereto, the pawls 221 being mounted fast on the undersurfaces of rear end portions of the leaf springs 223. In their normal downward positions (shown by full lines in Figs. 35 and 37), the pawls extend below the uppermost surfaces of their respective cooperating tables 125 to 132, inclusive, respectively, and said pawls are beveled at their surfaces to facilitate sliding movements thereunder, in a forward direction, of partitions X, X', X'', Y, Y', Y'', Y''', and Y''''. The pawls 221 are so located longitudinally of their respective cooperating hold-downs, and with respect to the partition-engaging front end portions 194 of pusher pawls 192, that they will drop in behind the partitions at the end of each forward impulse over the table (see for example Figs. 35 and 37). Each of the tables 125 to 132, inclusive, is equipped with a laterally aligned set of anti-reversing pawls 221 for each partition lying on that table forwardly of the magazine of that table, between intermittent forward feeding impulses. Hence, since the various tables vary in length, the number of sets of anti-reversing pawls 221 will vary accordingly.

Located adjacent the ejector zone C is a power-driven endless conveyor 224, which is positioned to receive completed assembled cell case cores of the general character shown in Fig. 1 from the group of holders 14 located in the said ejector zone C. This endless conveyor 224 comprises a wide endless conveyor belt 225 running over a power-driven roller 226 and an idling roller 227, the former being journalled in bearings 228, and the latter in bearings 229. The power driven roller 226 is driven from an electric motor 230 through power transmission mechanism comprising a pulley 231 on the shaft of motor 230, a pulley 232 fast on the shaft of roller 226, and a belt 233 running over said pulleys. In the arrangement illustrated, the endless conveyor 224 delivers to a suitable delivery chute 234.

Extending parallel to the plane of the front ends of partition holders of group 14 thereof, located in the ejector zone C and parallel to the plane of the longitudinal edge of the conveyor belt 225, and located somewhat above the plane of the upper surface of the latter, is an adjustable back-stop 237 which is engaged by completed cell case core assemblies as they are ejected from the holders in the ejector zone C during their passage by gravity from the holders to the surface of the conveyor belt 225. This back-stop is mounted for adjusting movements toward and from the vertical plane of the free ends of the group of holders 14 on the ejector zone C to accommodate partitions of varying depths, and is so adjusted as to prevent tipping of the completed cell case core assemblies and insure proper location thereof upon the belt. The adjustable mountings for this back-stop 237 comprise parallel pivoted links 238 connected respectively to the back-stop 237 and a main frame supported bracket structure 239 through the medium of fixed pivots. By reference particularly to Figs. 43 and 44, it will be seen that the back-stop may be adjusted in a horizontal plane by merely swinging the arms or links 238. By reference also to Figs. 43 and 44, it will be seen that the adjustable back-stop 237 may be retained in any desired adjusted position by means of an adjusting link 240 connected to the back-stop 237 by a fixed pivot at one end and pivotally connected at its other end to a set screw-equipped slide block 241 slidably mounted on a guide bar 242.

*Preparation and adjustment of machine for operation*

Preparation of the machine for assembly of cell case cores made up of the number and kind of partitions shown in Fig. 1, and which requires the full capacity of the machine, involves the following steps, to wit:

1. First will come the loading of the magazines 117, 118, and 119 respectively with stacks of partitions X, X', and X'' and the adjustment of the upstanding guide posts 144, 145, and 153 of each of said magazines to snugly but vertically slidably receive a stack of partitions X, X', or X'' (see particularly Fig. 39). By reference particularly to Fig. 39, it will be seen that the slots Xa of all partitions stacked in magazines 117, 118, and 119 face rearwardly of the machine. Also, by reference to Fig. 39, it will be seen that the slots Xa of all partitions of the stacks in each of the magazines 117, 118, and 119 are maintained in vertical alignment and are positively positioned laterally of the machine by engagement in vertically-aligned slots of the partitions in each magazine stack of the guide flange 144' of T-shaped guide post 144 of each magazine. This is a decided advantage over the teachings of the previously-identified Porter application, wherein slot alignment and positioning was determined by guides engaging the opposite laterally-spaced side edges of the partitions, this advantage being attributable to the fact that it is the slots Xa which must be properly positioned for the assembly operation and which is a feat difficult of accomplishment when endeavoring to control slot positioning or alignment from the edges of the partitions, the dimensions of which and the spacing of the side edges of which from the slots may be subject to some variation in cutting. In the machine of the Porter application before-identified, any such inaccuracy resulted in mispositioning or alignment of the partition slots, but in the machine of the present application such minor inaccuracies of the partitions are of no material consequence, since alignment of the slots in the later instance is by the slots themselves.

2. Next will come the loading of the magazines 120, 121, 122, 123, and 124 of dispenser group B' respectively with a stack of partitions Y, Y', Y'', Y''', or Y'''' and the adjustment of the guide posts 143 and 154 to snugly but vertically slidably receive such stacks of partitions. This is accomplished in exactly the manner described in connection with dispenser group A', but through adjustment of upstanding guide posts 143 and 154 which correspond respectively to guide posts 144 and 145 of dispenser group A'. It will be noted, however, that the partitions of dispenser group B' are all arranged so that their slots face or open forwardly of the machine and that vertical alignment of all slots in a common partition stack and lateral positioning of all partition slots Ya with respect to the machine are maintained by a guide flange 154' with one vertically-aligned group of partition slots in each stack of partitions.

With respect to 1 and 2 above, it will be observed that the machine may be built with a greater or lesser number of magazine-equipped dispensing mechanisms in the dispenser groups A' and B' and that only as many magazine-equipped dispensers of the dispenser groups A and B as are necessary to assemble any partition cell case core need be used at any one time. For example, if the cell case core to be assembled involves only two partitions, then only one magazine in dispenser group A' and only one magazine in dispenser group B' need be loaded.

3. Next, we may vertically adjust the spacing of tables 125 and 127 of dispenser group A' with respect to the intermediate table 126 of said dispenser group according to the spacing of the slots in the partitions Y, Y', Y'', Y''' and Y'''' of the stacks thereof contained in the magazines of dispenser group B'. This can be most readily accomplished by holding a partition Y, for example, vertically with the bottom of its central slot Ya aligned with the upper surface of intermediate table 126 and then adjustably moving the cooperating tables 125 and 127 until their upper edges become aligned with the lower edges of the upper and lower slots respectively in the said partition Y. Of course, in some instances, it will be necessary to initially adjust the center table 126, which is accomplished by unitary adjusting movements of the several tables.

4. The next adjustment to be made will be to progressively align the sets of holders 15, 16, and 17 of each of the holder groups 14 of the turret respectively with tables 125, 126, and 127 while the latter are positioned in the receiving zone, this being accomplished in connection with each holder group 14 by vertically adjustably sliding the heads 19 of holder sets 15, 16, and 17 on their cooperating guide bars 20, while located in the receiving zone A, as shown for example in Figs. 2 and 5. At this time we should also adjust the several holders of the individual holders 15', 16' and 17' of the holder group 14 located in the receiving zone horizontally to obtain desired spacing, and which, in some cases, will be such as to align each holder of each of the sets 15, 16 and 17 with a different slot in a partition X, X' or X''. This will be accomplished by slidably adjusting the guide bars 20 and their thumb screw-equipped heads 23 on the supporting rails 24.

5. The next normal step in the preliminary adjustment of the machine is to adjust the vertical spacing of the several tables 128–132 inclusive of dispenser group B' to correspond to the spacing of the slots Xa of partitions from dispenser group A', this being accomplished in the manner described in connection with tables 125, 126, and 127 of dispenser group A' under 3 above.

6. In the order of progression chosen, for the purpose of the present example, will come the adjustment of the back stop and ejector devices 28 to operate properly in conjunction with the particular partitions being operated on, this being, as previously indicated, accomplished by slidably adjusting the stop collars 35 on the guide rods 32 so that the partition-engaging portions 29 of such devices will engage or substantially engage the front edges of partitions fed into the various holders in holder groups 14 by the dispenser mechanism in dispenser group A'. As also previously indicated, the back stop and ejector devices 28, when thus adjusted, serve as bases for reaction for partitions fed into cross-assembled relationship in the assembly zone B with partitions previously delivered to the holders in assembly zone A. Of course, it will be obvious that the sequence of adjustments above described may be varied.

*Résumé of operation*

With the machine thus adjusted and loaded, as above indicated, the machine will be set in operation by energization of the electric motors M and 230, and will operate substantially as follows: The turret wheel 9 will be intermittently rotated in a clockwise direction by 90° steps. All of the pusher-type conveyors of dispenser groups A' and B' will be forwardly and rearwardly reciprocated in unison at the rate of one complete reciprocation for each 90° movement of the turret. For each period that a group 14 of holders is stationary in the receiving zone, the three pusher-type conveyors of dispenser group A will collectively deliver a laterally-spaced parallel group of partitions to the group 14 of holders located in the receiving zone. During the next subsequent 90° movement of the turret wheel 9, the group of partitions previously placed in a group 14 of holders in the receiving zone A will be carried into the assembly zone B. It should be understood, however, that the several reciprocating pusher-type conveyor mechanisms of dispenser groups A' and B' each make a forward stroke each time the turret wheel 9 is stationary, and a return stroke during each period of movement of the turret wheel 9. During the next period of rest of the turret wheel 9, the group of partitions carried into the assembly zone B from the receiving zone A will be disposed vertically, and while so positioned in the assembly zone, will have assembled thereon collectively by the several pusher-type conveyor mechanisms of dispenser group B', in closely assembled relationship thereon, a laterally spaced group of partitions, thereby completing a cell case core, as shown in Fig. 1. This completed cell case core, as shown in Fig. 1, will be carried from the assembly zone B to the ejector zone C during the next 90° step of movement of the turret wheel 9, and while at rest in said ejector zone, the said completed cell case core assembly will be ejected from the group of holders 14, then located in the ejector zone, by the combined back-stop and ejector device 28 for the set of holders thus located in the ejector zone. This ejection of the completed cell case core assemblies from the group of holders 14 located in the ejector zone C is, as previously indicated, the result of a forward and rearward reciprocation imparted to each combined back-stop and ejector device 28 during each period of rest in the ejector zone C by reciprocating arm 99 and its head 100. Obviously, of course, each completed cell case core assembly, as shown in Fig. 1, ejected from a group 14 of holders in the ejector zone, will drop onto the continuously operating conveyor belt 225 and be disposed of over chute 234. Of course, the steps of operation just recited will be continuously and rapidly repeated during the entire period of operation of the machine, there being for each period of rest of the turret wheel 9, three simultaneous functions, to wit:

(A) Delivery of a group of partitions to a group 14 of holders located in the receiving zone;

(B) The cross assembly with a group of partitions located in the assembly zone of a group of partitions delivered thereto by the conveyor mechanisms of dispenser group B'; and (C) The ejection of completed cell case cores from a group of holders then located in the ejector zone C.

What we claim is:

1. In a cell case partition assembling machine, a group of cell case partition holders for collectively receiving and holding a group of partitions in spaced side by side relationship, said holders being adapted to receive partitions to different depths, a parallel group of like partition dispensers each feeding a single partition edgewise into a different one of the holders of the group thereof for each of a sequence of operating cycles and to a varying depth depending upon the depth of such partitions, mechanism collectively operating and dispensers in timed relation to one another whereby said dispensers will collectively feed partitions to the group of holders in groups of spaced partitions, an adjustable stop means associated with and common to all holders of the group thereof for limiting movements of partitions into all holders of the group to varying common depths, said adjustable stop means comprising a portion disposed in the line of feed of the dispensers of said group thereof and being adjustably movable toward and from the group of dispensers, and means positively restraining the common stop means against movement in the direction of feed from different adjusted positions.

2. In a cell case partition assembling machine, a group of cell case partition holders for collectively receiving and holding a group of partitions in spaced side by side relationship, said holders being adapted to receive partitions to different depths, a parallel group of like partition dispensers each feeding a single partition edgewise into a different one of the holders of the group thereof for each of a sequence of operating cycles and to a varying depth depending upon the depth of the partition, mechanism collectively operating the dispensers in timed relation to one another whereby said dispensers will collectively feed partitions to the group of holders in groups of spaced partitions, an adjustable stop element associated with and common to all holders of the group thereof for limiting movements of partitions into all holders of the group to varying common depths, said common stop element having portions disposed in the line of feed of all the dispensers of said group thereof, means mounting the said common adjustable stop element for adjusting movements longitudinally of the direction of feed of partition dispensers, and means positively restraining the common stop element against movement in the direction of feed from different adjusted positions.

3. The structure defined in claim 1 in which the said holders of the group thereof are each of the spring friction type and are elongated in the direction of feed of partitions thereinto.

4. The structure defined in claim 2 in which the said holders of the group thereof are each of the spring friction type and are elongated in the direction of feed of partitions thereinto.

5. In a cell case partition assembling mechanism, a partition holder for receiving to different depth partitions fed edgewise thereto, partition dispensing mechanism intermittently feeding partitions to the holder to varying depths depending on the depths of such partitions, an adjustable back-stop cooperatively associated with said partition holder and limiting movements of partitions thereinto to predetermined maximum depths, said partition holder having a receiving end adjacent the dispensing mechanism, means mounting the back-stop for sliding movements toward and from the receiving end of the partition holder, an adjustable stop adjustably but positively limiting sliding movements of the back-stop in the direction of feed of partitions into the holder, and means yieldingly biasing the back-stop toward said stop and in the direction of feed.

6. In a cell case partition assembling machine, a partition holder for receiving to different depths partitions fed edgewise thereto, partition dispensing mechanism intermittently feeding partitions edgewise to the holder to varying depths depending on the depths of such partitions, said partition holder being elongated in a direction opposed to the direction of feed from the dispensing mechanism and having a mounted front end and a free partition receiving rear end adjacent the dispensing mechanism, a combined back-stop and partition ejector associated with the partition holder and orientated in the line of feed of partitions fed into the holder, means mounting the combined back-stop and ejector for sliding movements forwardly and rearwardly of the machine from a partition stop position forwardly of the receiving end of the holder to a partition ejecting position adjacent the receiving rear end of the holder, an adjustable stop adjustably but positively limiting forward movements of the combined back-stop and ejector to different stop positions depending upon the depth of the partitions to be fed to the holder by the first dispenser, and mechanism timed with the dispensers for reciprocating the combined back-stop and ejector from its forward partition stop position to its rearward partition ejecting position and back to its forward stop position intermediate each delivery operation of the dispensing mechanism to said holder.

7. In a cell case partition assembling machine, a partition holder for receiving to different depths partitions fed edgewise thereto, partition dispensing mechanism intermittently feeding partitions edgewise to the holder to varying depths depending on the depths of such partitions, said partition holder being elongated in a direction opposed to the direction of feed from the dispensing mechanism and having a mounted front end and a free partition receiving rear end adjacent the dispensing mechanism, a combined back-stop and partition ejector associated with the partition holder and orientated in the line of feed of partitions fed into the holder, means mounting the combined back-stop and ejector for sliding movements forwardly and rearwardly of the machine from a partition stop position forwardly of the receiving end of the holder to a partition ejecting position adjacent the receiving rear end of the holder, and adjustable stop adjustably but positively limiting forward movements of the combined back-stop and ejector to different stop positions depending upon the depth of the partitions to be fed to the holder by the said dispensing mechanism, yielding means biasing the combined back-stop and ejector in a forward direction to the limit determined by the adjustable stop, and mechanism timed with the dispenser mechanism for moving the combined back-stop and ejector rearwardly to its partition ejector following each delivery operation of the dispenser.

8. In a cell case partition assembling machine, a partition holder for receiving to different depths partitions fed edgewise thereto, a first partition dispenser located at one side of the holder and intermittently delivering cell case partitions edgewise thereto, a second cell case partition dispenser located at the same side of the holder and intermittently delivering partitions into positions of crossed assembled relationship with partitions held by said holder and placed therein by the first dispenser, mechanism operating the dispensers in definite timed relation to one another, said partition holder being elongated in a direction opposite to the direction of feed from the first dispenser and having a mounted front end and a free partition-receiving rear end adjacent the dispensers, a combined back-stop and partition ejector associated with the partition holder and orientated in the line of feed of partitions into the holder, means mounting the combined back-stop and ejector for sliding movements forwardly and rearwardly of the machine from a partition stop position forwardly of the receiving end of the holder to a partition ejector position adjacent the receiving rear end of the holder, an adjustable stop adjustably but positively limiting forward movements of the combined back-stop and ejector to different stop positions depending upon the depths of partitions fed into the holder by the first dispenser, and mechanism timed with the dispensers for reciprocating the back-stop from its forward partition stop position to its rearward partition ejecting position and back to its forward stop position following each assembly operation of the second dispenser, the combined back-stop and ejector serving as a base of reaction for partitions held by the holder during periods when other partitions are being assembled on the first said partitions by the second dispenser.

9. In a cell case partition assembling machine, a partition holder for receiving to different depths partitions fed edgewise thereto, a first partition dispensing mechanism intermittently feeding partitions edgewise to the holder to varying depths depending upon the depths of such partitions, a second dispensing mechanism located at the same side of the holder and intermittently delivering partitions into positions of crossed assembled relationship with partitions held by said holder and placed therein by the first dispensing mechanism, mechanism operating the dispensing mechanisms in definite timed relation to one another, said partition holder being elongated in a direction opposite to the direction of feed from the first dispensing mechanism and having a mounted front end and a free partition-receiving rear end adjacent the dispensing mechanism, a combined back-stop and partition ejector associated with the partition holder and oriented in the line of feed of partitions into the holder, means mounting the combined back-stop and ejector for sliding movements forwardly and rearwardly of the machine from a partition stop position forwardly of the receiving end of the holder to a partition ejecting position adjacent the receiving end of the holder, an adjustable stop adjustably but positively limiting forward movements of the combined back-stop and ejector to different stop positions determined by the depth of the partitions to be fed to the holder by the first partition dispensing mechanism, yielding means biasing the combined back-stop and ejector forwardly toward its stop position, and mechanism timed with the dispensing mechanisms and moving the combined back-stop and ejector rearwardly against the yielding means to its partition ejector positioned following each assembly operation of the second said dispensing mechanism, the combined back-stop and ejector serving as a base of reaction for partitions held by the holder during periods when other partitions are being assembled on the first said partitions by the second dispensing mechanism.

10. A cell case partition assembling machine, a partition holder for receiving to definite depths partitions fed edgewise thereto, a conveyor on which the holder is mounted for movements from a receiving zone to an assembly zone, mechanism operating the conveyor to repeatedly move the holder thereof from the receiving zone to the assembly zone, a first partition dispensing mechanism located adjacent the receiving zone and intermittently feeding partitions edgewise to the holder to varying depths depending upon the depth of such partitions, a second dispensing mechanism located at the same side of the holder and adjacent the assembly zone and intermittently delivering partitions into positions of crossed assembled relationship with partitions held by the holder and placed therein by the first dispensing mechanism, mechanism operating the dispensing mechanism in definite timed relationship to one another and the conveyor, said partition holder being elongated in a direction opposite to the direction of feed from said dispensing mechanisms and having a mounted front end and a free partition receiving rear end adjacent the dispensing mechanism, a combined back-stop and ejector carried by the conveyor in association with the holder and oriented in the line of feed of partitions into the holder, means mounting the combined back-stop and ejector for movements forwardly and rearwardly of the machine from a partition stop position forwardly of the receiving end of the holder to a partition ejecting position adjacent the receiving end of the holder, an adjustable stop adjustably but positively limiting forward movements of the combined back-stop and ejector to different stop positions determined by the depth of the partitions to be fed to the holder by the first dispensing mechanism, and mechanism timed with the dispensing mechanism and conveyor and reciprocating the combined back-stop and ejector from its stop position to its ejecting position and back to its stop position following each assembly operation of the dispensing mechanism, the combined back-stop and ejector serving as a base of reaction for partitions held by the holder during periods when other partitions are being assembled on the first partition by the second dispensing mechanism.

11. In a cell case partition assembling machine, a group of cell case partition holders for collectively receiving and holding a group of partitions in spaced side by side relationship, said holders being adapted to receive partitions to different depths, a parallel group of like partition dispensers each feeding a single partition edgewise into a different one of the holders of the group thereof for each of a sequence of operating cycles and to a varying depth depending upon the depth of such partitions, mechanism collectively operating the dispensers in timed relation to one another whereby said dispensers will collectively feed partitions to the group of holders in groups of spaced partitions, an adjustable stop means associated with and common to all holders of the group thereof for limiting movements of partitions into all holders of the group to varying common depths, said adjustable stop means comprising a portion disposed in the line of feed of the dispensers of said group thereof and being adjustably movable toward and from the group of dispensers, means positively restraining the common stop means against movement in the direction of feed from different adjusted positions, and means mounting the partition dispensers of said group thereof for relative adjusting movements toward and from one another for varying the lateral spacing of a group of partitions collectively delivered thereby, and means mounting the holders of said group thereof for corresponding adjustments toward and from one another, the said adjustable stop means having a partition engaging portion orientated in the plane of feeding movement of each of the dispensers of said group in all adjusted positions thereof.

References Cited in the file of this patent

UNITED STATES PATENTS

| Number | Name | Date |
|---|---|---|
| 369,944 | Jaeger | Sept. 13, 1887 |
| 575,096 | Batchelder | Jan. 12, 1897 |
| 659,010 | Williams | Oct. 2, 1900 |
| 667,287 | Batchelder | Feb. 5, 1901 |
| 1,059,325 | Weis | Apr. 15, 1913 |
| 1,110,656 | Starman | Sept. 15, 1914 |
| 1,290,816 | Weis et al. | Jan. 7, 1919 |
| 1,673,902 | Cowgill | June 19, 1928 |
| 2,092,760 | Jensen et al. | Sept. 14, 1937 |
| 2,163,923 | Vail et al. | June 27, 1939 |
| 2,352,088 | Evans | June 20, 1944 |
| 2,493,243 | Godwin | Jan. 3, 1950 |